United States Patent [19]
Macleod

[11] Patent Number: 5,995,312
[45] Date of Patent: *Nov. 30, 1999

[54] HIGH CAPACITY DISK DRIVE

[75] Inventor: Nigel Macleod, Glenrothes, United Kingdom

[73] Assignee: Rodime PLC, Glenrothes, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/116,558

[22] Filed: Sep. 7, 1993

Related U.S. Application Data

[63] Continuation of application No. 07/884,918, May 18, 1992, abandoned, which is a continuation of application No. 07/411,183, Sep. 19, 1989, abandoned, which is a continuation of application No. 07/129,931, Dec. 1, 1987, abandoned, which is a continuation of application No. 06/773,136, Sep. 6, 1985, abandoned.

[51] Int. Cl.$^6$ ........................................... G11B 5/03
[52] U.S. Cl. ................................................. 360/66
[58] Field of Search ............................. 360/60, 55, 96.1, 360/97.01, 135; 714/746, 755

[56] References Cited

U.S. PATENT DOCUMENTS

| | | | |
|---|---|---|---|
| 4,392,095 | 7/1983 | Ruxton et al. | 318/254 |
| 4,489,259 | 12/1984 | White et al. | 318/696 |
| 4,538,192 | 8/1985 | White et al. | 360/98 |
| 4,568,988 | 2/1986 | McGinlgy et al. | 360/77 |
| 4,639,863 | 1/1987 | Harrison et al. | 364/200 |

OTHER PUBLICATIONS

"PC Sources", Jan. 1991 Issue, p. 105.

*Primary Examiner*—Trinh L. Tu
*Attorney, Agent, or Firm*—Thelen Reid & Priest, LLP

[57] ABSTRACT

A high capacity computer disk drive system operating a micro-hard disk drive is disclosed in which the hard disk rotates at a speed of approximately 2746 r.p.m. and in which the data received from the host computer for storage on the hard disk is converted to 2,7 RLL coding prior to being written onto the disk. The disk drive system disclosed herein has a formatted data storage capacity in excess of 10 MB and an unformatted digital information storage capacity in excess of 12.5 MB, using both sides of the disk. The micro-hard disk drive system is connected to a host computer using a Small Computer Systems Interface (SCSI) which eliminates the need to provide additional disk controller hardware and software in the host computer. The micro-Winchester disk drive system is particularly suited to meet the needs of a portable computer system.

11 Claims, 17 Drawing Sheets

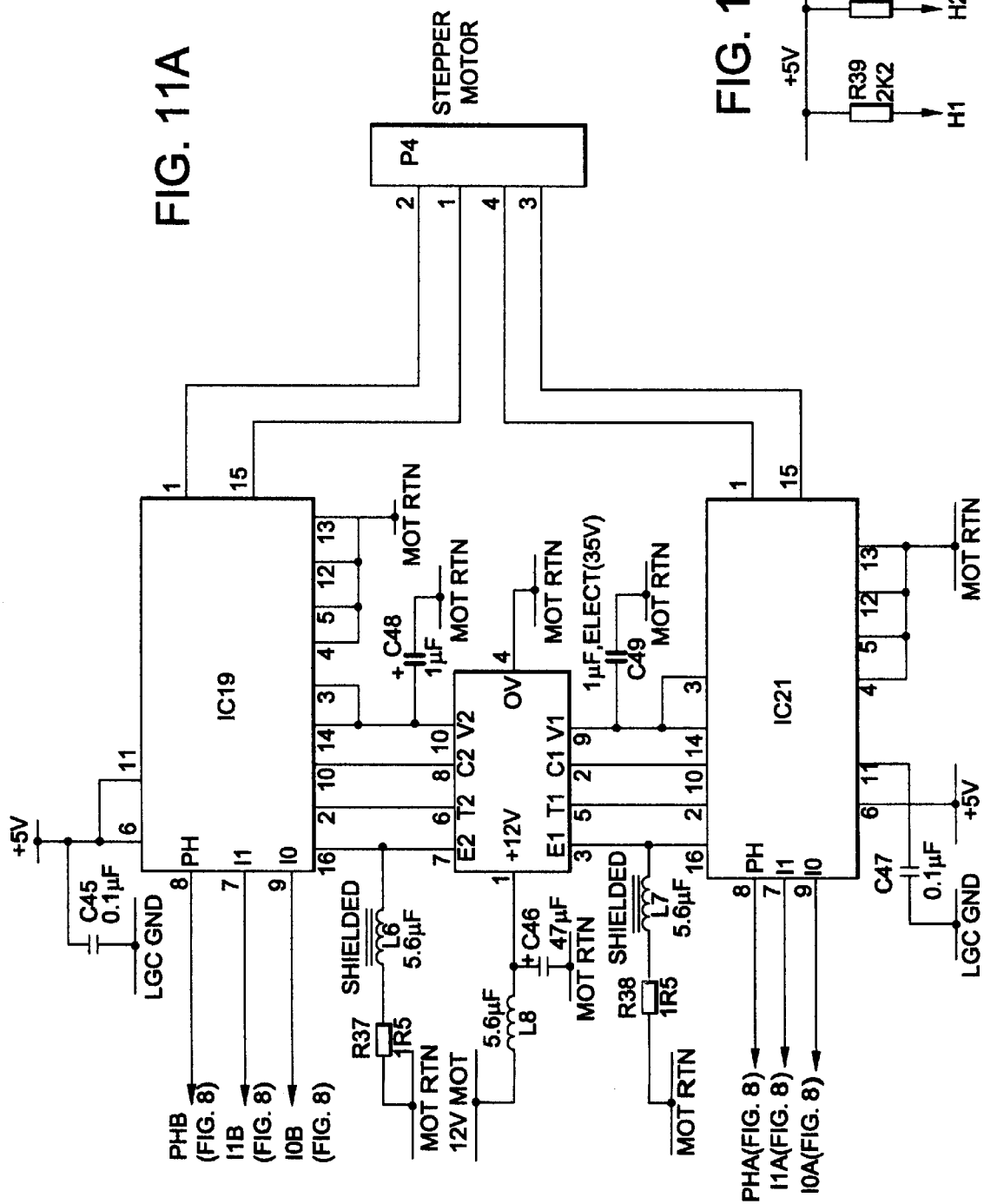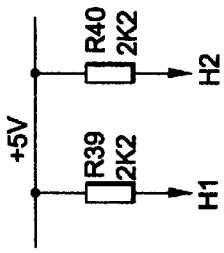

HIGH CAPACITY DISK DRIVE

CROSS-REFERENCE TO RELATED APPLICATIONS

This application is a Continuation of U.S. patent application Ser. No. 884,918, filed May 18, 1992, now abandoned, which is a continuation of U.S. Ser. No. 411,183, filed Sep. 19, 1989, now abandoned, which is a continuation of U.S. Ser. No. 129,931, filed Dec. 1, 1987, now abandoned, which is a continuation of U.S. Ser. No. 773,136, filed Sep. 6, 1985, now abandoned.

The assignee of the instant application is also the assignee of an application filed Feb. 22, 1984, entitled "Micro Hard-Disk Drive System," U.S. patent application Ser. No. 582,554. The disclosure of that application is hereby incorporated by reference herein.

BACKGROUND OF THE INVENTION

The present invention relates to a micro-hard disk drive system, and in particular, a micro-Winchester high capacity disk drive with integral controller electronics.

With the rapidly expanding development of personal computers, portable personal computers and desk top data processing systems, there has been a demand for increasing the performance of the disk drive systems of such computers. A major development in that direction has been the introduction of small Winchester disk drives as replacements and enhancements to floppy disk drives for program storage. The Winchester disk drive in general provides higher capacities and faster speeds of operation, factors which are important for the effective use of personal computers running advanced software packages.

The types of Winchester disk drives that have been developed in that regard were based upon the use of hard disks of diameter of approximately five and one-quarter inches, also known as mini-Winchester disks. Such so called "five and one-quarter inch" disk drives have generally developed as an "industry standard." Such Winchester disk drive systems can typically store 5–30 Megabytes of information when designed around an open-loop positioning system using a stepper motor capable of supporting up to approximately 360 data tracks per inch. However, advances made by the assignee of the present invention have expanded the storage capacity of the typical five and one-quarter inch disk drive up to 600 tracks per inch using the same basic type of open-loop positioning system. Such a track density had previously been believed unobtainable with stepper motor technology.

With the introduction of portable personal computers, it is clearly a performance advantage to achieve a high degree of software compatibility with the desk top computing systems. In addition, portability demands special requirements on the incorporation of a hard disk system, for example, light weight, low-power consumption and the capability of withstanding harsher shock and vibration conditions. However, software compatibility also demands performance parameters such as data storage capability, comparable to those available on five and one-quarter inch mini-Winchester disk drive systems.

Among the various advances that have been made in the construction and operation of disk drive systems are those developments made by the assignee of the present application, Rodime PLC, which developments are set forth in the following U.S. Patent and Patent applications. The subject matter of such patent and patent applications is hereby incorporated by reference.

U.S. Pat. No. 4,392,095, entitled "Method of and Apparatus for Generating a Unique Index Mark from the Commutation Signal of a D.C. Brushless Motor," discloses a system for providing a unique index mark relative to the computer disk which is required for avoiding errors in addressing a memory location on the disk surface. That index mark is provided by correlating the commutation signal from a d.c. motor with a synchronizing signal present on one or more discrete tracks of the computer disk.

U.S. patent application Ser. No. 332,003, (now abandoned) entitled "Read/Write Head Thermal Compensation System," discloses a thermal compensation system used by Rodime PLC in its five and one-quarter inch disk drive system. The positioning mechanism of that system is shown in FIG. 5 of the present application. That thermal compensation system uses different materials with different co-efficients of thermal expansion for various components of the positioning mechanism for the read/write head used in the disk drive system. In the operation of that thermal compensation system, in response to a change in temperature, a mispositioning of the read/write head is compensated for by a counter-movement due to the selection of various materials with different co-efficients of thermal expansion within the mechanical arrangement.

U.S. Pat. No. 4,538,192, entitled "Ventilation System for a Computer Disk Drive Hub Assembly," discloses a ventilation system for use in a computer disk drive which enables the disk file data storage capacity to be increased for a given volume of chamber housing the disk and improves the disk drive operating performance.

U.S. Pat. No. 4,489,259, entitled "Method and Apparatus for Controlling a Stepper Motor," discloses a system for minimizing oscillations of the stepper motor for a single step, minimizing the time taken for the stepper motor to move between tracks for multi-track seek operations and reducing the angular hysteresis due to the mechanical and magnetic properties of the stepper motor construction. In controlling the operation of the stepper motor, a microprocessor circuit is adapted to drive the stepper motor in accordance with predetermined programs.

U.S. Pat. No. 4,568,988, entitled "Micro-Hard Disk Drive System," discloses a high-density micro-Winchester hard disk system using a hard disk of approximately three and one-half inches and having digital information stored at a density of approximately 600 concentric tracks per inch, and at a storage density equivalent to at least 5 Megabytes per hard-disk. A stepper motor is designed to increment in steps of 0.9° which causes the read/write head to move from one track to the next adjacent track on the hard disk. For many applications, it has now become advantageous to utilize a high performance three and one-half inch Winchester disk drive having a storage capacity in excess of that achieved in the above-disclosed micro-hard disk drive system, namely in excess of 10 Megabytes. Such increased storage capacity allows the use of more sophisticated programs and the storage of data for use therewith than has been possible heretofore.

Such prior art disk drives have almost exclusively used the "industry standard" ST 506 interface to the host system. That interface has the disadvantage that it defines fundamental operating parameters of the disk drive, such as MFM (modified frequency modulation) coding, data transfer rate and disk rotational speed, which limit the storage capability of the disk drive. The ST 506 interface further requires additional controller electronics to be provided by the user to carry out formatting, MFM encode/decode, block address decode, error detection/correction and other functions.

While the invention described herein utilizes an open-loop positioning system to achieve cost effectiveness while still attaining a storage capacity in excess of 10 Megabytes, a more expensive closed-loop positioning system could readily be utilized in place of that open-loop positioning system.

SUMMARY AND OBJECTS OF THE INVENTION

In view of the foregoing, it should be apparent that there still exists a need in the art for a compact micro-hard disk drive system having high performance and high storage capabilities. It is, therefore, a primary object of this invention to provide such a high capacity micro-hard disk drive system which has particular application for use with both personal and portable personal computers.

A further object of the present invention is to provide an improved high capacity hard disk drive system in which the size weight, sensitivity to vibration, power consumption and heat dissipation are minimized without sacrificing high performance and high storage capabilities, thereby rendering the system particularly advantageous for use in portable computing systems.

Still another object of the present invention is to provide a micro-Winchester disk drive with an open-loop positioning system capable of providing performance parameters comparable to those of a five and one-quarter inch Winchester disk drive.

Another object of the present invention is to provide a micro-Winchester disk drive system that affords storage capacity of at least approximately 10 Megabytes per disk.

A still further object of the present invention is to provide a micro-Winchester disk drive system that is electrically compatible with five and one-quarter inch disk drives in its interface to computer systems.

Another object of the present invention is to provide a high capacity micro-hard disk drive system in which the disk housing assembly is secured with a set of anti-vibrational mounts which isolates the housing against vibrational forces.

Another object of the present invention is to provide a micro-Winchester disk drive system in which data is stored at a density of at least 600 tracks per inch.

Still another object of the present invention is to provide a high capacity micro-hard disk drive system having a disk rotational speed of approximately 2746 RPM and which uses 2,7 RLL coding to achieve a formated storage capacity of approximately 10 Megabytes per disk.

It is yet another object of the present invention to provide a micro-hard disk drive system having a thermal compensation system which compensates for any misalignment of the read/write head positioning mechanism due to thermal effects.

A further object of the present invention is to provide a high capacity micro-hard disk drive system having a pre-amplifier mounted within the clean chamber of the system as close as possible to the head assembly in order to minimize noise pick-up.

Another object of the present invention is to provide a micro-Winchester disk drive system in which the user is relieved of the need to provide additional disk controller hardware and software by means of interfacing to the host computer using the SCSI hardware and protocol.

Briefly described, these and other objects of the present invention result in a high capacity micro-Winchester disk drive system which provides a disk drive system particularly suited to meet the needs of a portable computer system, as well as meeting the needs of a personal computer system. The terminology "micro-Winchester" disk refers to a Winchester disk of 85–100 millimeters in diameter, with the preferred embodiment being approximately 96 millimeters. A Winchester disk of that size can also be referred to as a "3.5 inch" Winchester disk. That high capacity micro-Winchester disk drive system was developed to incorporate the 600 tracks per inch open-loop positioning capability previously developed by the assignee, and utilizes a slower disk rotational speed and 2,7 RLL (Run Length Limited) coding for achieving a storage capacity heretofore unachievable in a micro-Winchester hard disk. Such new disk drive system, by virtue of its small size, vibrational isolation, integral controller and high storage capacity, is ideally suited for use in both personal and portable computer systems.

The high capacity disk drive system of the present invention is constructed for operating micro-Winchester computer disks. This disk drive system provides fast access to a high capacity data storage for use with small business computers, terminals, and microprocessor-based systems, portable or otherwise, and many other areas where compact, rugged and lightweight hard disk storage is required. The disk drive system of the present invention normally utilizes either one or two hard disks such as Winchester disks, and provides data storage on each disk in excess of 10 Megabytes once the disks are formatted. The system is capable of storing in excess of 12.5 Megabytes per disk with the disk unformatted. It should be understood, however, that data is recorded on both sides of each disk.

Each of the hard disks is mounted for rotation within the housing of the hard disk drive system of the present invention. In accordance with the preferred embodiment, each of those hard disks is 96 millimeters in diameter. A transducer, which includes two read/write heads for each disk within the system, one head positioned on each side of the disk, writes digital information on and reads digital information from the hard disk. The disk drive system of the present invention operates such that information is stored on the disk at a density of at least 600 concentric tracks per inch. A positioning mechanism moves the transducer between the tracks on the computer disk for writing information to and reading information from the disk. The heretofore unachievable storage capacity is achieved by the present invention by operating the disk at a rotational speed of approximately 2746 RPM, and by coding the data before it is recorded on the disk using a 2,7 RLL coding technique.

The positioning mechanism of the disk drive system of the present invention is arranged for moving the transducer along a path extending in an approximately radial direction with respect to the hard disk so that the transducer can move between the inner-most and outer-most tracks on the disk. The positioning means moves the transducer along an arcuate path that extends in the radial direction with respect to the disk.

The positioning mechanism of the disk drive system of the present invention includes a stepper motor and a mechanism for operating the stepper motor in full step increments. In the operation of the stepper motor, each step increment is approximately 0.9°. Each step movement of the stepper motor causes the transducer to move from one track to the next adjacent track. Each read/write head of the transducer is arranged on one end of a support arm, or flexure, which extends in a radial direction with respect to the computer disk. A positioning arm is attached to the other end of the support arm. The positioning arm has one end coupled to a pivot shaft for enabling the positioning arm to be pivoted about the axis of the pivot shaft. That pivot shaft is located on one side of the support arm and is spaced away from that arm.

The stepper motor has an output drive shaft for controlling the movement of the positioning arm. A tensioned steel band is coupled to the drive shaft of the stepper motor via a pulley and is also coupled to both the end of the positioning arm on the opposite side of the support arm from the pivot shaft, and to a tensioning spring attached to the positioning arm. The steel band is connected in a pulley arrangement for coupling the drive shaft of the stepper motor to the positioning arm such that rotational movement of the stepper motor causes the positioning arm to pivot about the pivot shaft. The pivoting movement of the positioning arm in turn moves the support arm and the transducer in incremental steps across the tracks of the disks.

The positioning arm is coupled directly to the pivot shaft, which itself is free to rotate by means of a bearing assembly which includes a pair of ball bearings arranged in a back-to-back configuration with a dimensional pre-load of approximately 5 pounds force. The stepper motor that is used for driving the positioning arm is a two-phase bi-polar stepper motor that operates in a full step mode. The tensioned steel band that interconnects the stepper motor to the positioning arm is a band etched from stainless steel with a tensile strength of greater than approximately 250,000 Psi.

In constructing the positioning mechanism of the high capacity disk drive system of the present invention, the materials for each of the components are selected to automatically compensate for any mispositioning between the transducer and a track caused by thermal effects. The positioning mechanism includes a primary thermal loop that, on average, causes the transducer to move inwardly from a track center as temperature rises. A second thermal loop is provided that causes a counter-movement to the movement caused by the primary thermal loop, thereby tending to maintain the transducer on the track centerline.

In order to provide for such thermal compensation of the positioning mechanism in the disk drive system of the present invention, three different classes of material are utilized. The positioning arm is formed of a first material. The disk and housing are formed of a second material. The pivot shaft, head support arm and metal band are formed of a third material. Those first, second and third materials have different co-efficients of thermal expansion. The arrangement, geometry and selection of materials of those parts are such that, in response to a change in temperature, the various components of the positioning system react in such a way that the support arm effectively rotates via the positioning arm and the pivot shaft so as to maintain the transducer substantially at its original track position. Consequently, the positioning system self-compensates for any movement that would be caused by changes in temperature.

The high capacity disk drive system of the present invention includes a housing in which the micro-hard disk, the transducer, the transducer pre-amplifier, and at least a portion of the positioning mechanism are contained. That housing is arranged within a first frame which holds the housing. A set of anti-vibration mounts secures the housing within the frame so as to minimize the transmission of shock or vibration from the frame to the housing. In addition, the frame supporting the housing holding the disk drive system can be arranged within a second larger frame.

In such a situation, the frame for the high capacity micro-Winchester disk drive system of the present invention can be held within a larger frame that would fit within an opening normally designed for use by either a regular five and one-quarter inch disk drive system or a so-called "half-height" five and one-quarter inch disk drive system.

The electronics of the high capacity micro-Winchester disk drive system of the present invention have been developed utilizing LSI circuits with the entire control circuit, except the pre-amplifier, being arranged on a single printed circuit board. Providing electronic functions of the drive on a single printed circuit board whose dimensions do not exceed the overall dimensions of the drive permits full utilization of the anti-vibration mounting systems and thus makes it possible to utilize the high capacity micro-Winchester disk drive of the present invention in portable computer systems. Further, the electronic functions have been implemented, in part, in several integrated circuit chips of different types with the objective of functioning with a minimum use of power. An additional feature in this regard is the location of the pre-amplifier for the read/write heads, which is mounted within the clean chamber as close as possible to the head assembly in order to minimize noise pick-up. That obviously provides for the increased probability of error-free operation during the reading and writing of information from and to the disk.

An additional feature is the use of a microprocessor routine which substantially reduces the power used by the stepper motor when the disk drive is de-selected by the host computer system. That "power-save" capability and low average power consumption are desirable properties of a hard disk drive when used in a portable computer system, since they result in less heat dissipation, thereby minimizing the requirement of the computer system to provide noisy, heavy and bulky air-extraction fans.

Still another feature of the present invention is the use of an ANSI X3T9.2 SCSI (Small Computer System Interface) in conjunction with the on-board microprocessor of the drive to interface with the host computer. By utilizing the SCSI hardware and protocol, 2,7 RLL encode and decode to NRZ, and a disk rotational speed of 2746 R.P.M., the disk drive will operate with its integral controller performing all functions normally associated with a separate host controller device. The disk drive of the present invention thus need include only an SCSI interface, controller logic and drive logic.

BRIEF DESCRIPTION OF THE DRAWINGS

FIGS. 8, 9, 10, 11, 12, 13 and 14 are schematic circuit diagrams of the control circuit for the disk drive system of the present invention.

DETAILED DESCRIPTION OF THE PREFERRED EMBODIMENT

Figure 1:
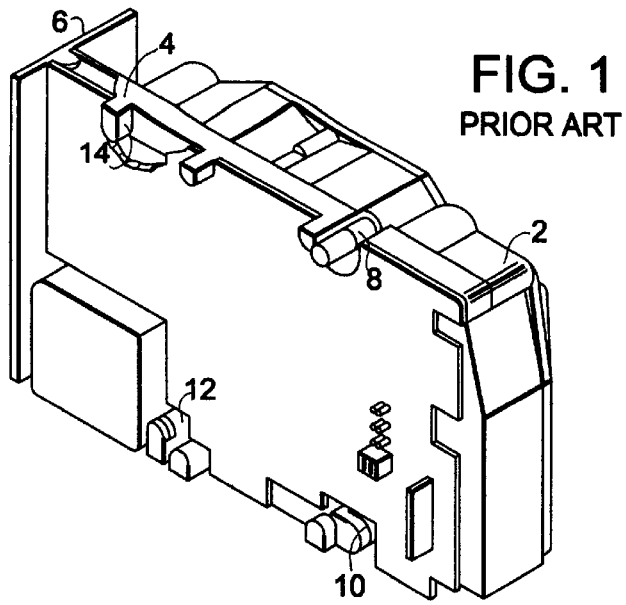
FIG. 1 is a side perspective view of the housing of the disk drive system of the present invention mounted within its first frame assembly.

Referring now in detail to the drawings wherein like parts are designated by like reference numerals throughout, there is illustrated in FIG. 1 a high capacity micro-Winchester disk drive system in accordance with the present invention. The high capacity disk drive includes a housing 2 which is mounted within a frame 4. The frame 4 is attached to a face plate, or facia 6. The face plate 6, together with housing 2 and frame 4, may be slid into a slot provided within a computer for the disk drive system. In order to secure housing 2, and hence the internal operating members of the high capacity disk drive system against vibrational forces, a plurality of anti-vibration mounts 8, 10, 12, and 14 are provided.

Figure 2:
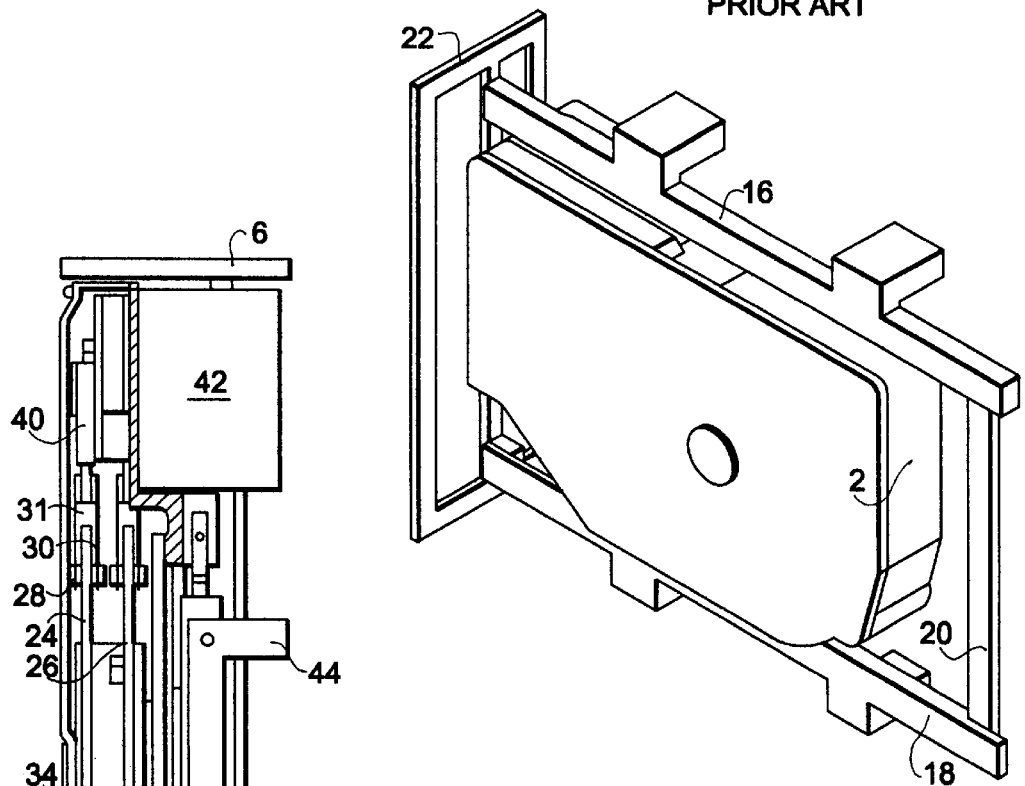
FIG. 2 is a side perspective view of the opposite side of the housing from the view of FIG. 1 of the disk drive assembly of the present invention with such housing and first frame being mounted within a second frame assembly.

It is possible to mount the high capacity micro-Winchester disk drive system of the present invention within a larger opening constructed to receive a 5¼ inch disk drive system. In such an arrangement, as shown in FIG. 2, the housing 2 with the frame 4 is placed inside of a second frame. That second frame is formed by top frame member 16, bottom frame member 18 and a cross bar 20. The second frame is attached to a face plate 22 and to the first frame 4.

The high capacity disk drive system in accordance with the preferred embodiment of the present invention is a microprocessor based device which receives and transmits 2-to-7 RLL (Run Length Limited) data, seeking the appropriate track in response to step commands across the disk control interface. The drive is fully soft sectored and is connected to the host computer via an on-board integral disk controller which communicates with the host computer via a Small Computer Systems Interface (SCSI). Interleave factors of 1 and a "host interface" data rate of up to 1.5 megabytes per second are utilized by the present invention to attain maximum performance. The integral disk drive controller is responsible for formatting, 2-to-7 RLL encode and decode to NRZ, block address decode, CRC generation and verification and other functions. There are two embodiments containing 1 and 2 hard disks and respectively ranging in total data storage from 12.75 to 25.50 megabytes. Typical format schemes with 256 data bytes per sector and 36 sectors per track or 512 data bytes per sector and 32 sectors per track can realize an efficiency of about 79%, giving formatted capacities in excess of 20 megabytes.

A summary of some important performance parameters is given below:

GENERAL PERFORMANCE

| | |
|---|---|
| Disks | 1, 2 |
| Heads | 2, 4 |
| Formatted capacity (typical) | |
| Per drive (Megabytes) | 10.0, 20.0 |
| Per track (Bytes) | 16,384 |
| Per sector (Bytes) | 512 |
| Sectors per track | 32 |
| Cylinders | 306 |
| Transfer rate (Kbytes/second) | 937 |
| Seek times (ms) (including settling) | |
| Track to Track | 18 |
| Average | 85 |
| Maximum | 180 |
| Average Latency (ms) | 10.9 |
| Flux reversals per inch (max) | 14,700 |
| Tracks per inch | 600 |

-continued

| | |
|---|---|
| Rotational speed (r.p.m.) | 2,746 ± 27 r.p.m. |
| Shock | |
| Operating | 10 g |
| Non-operating | 40 g (all axes; 10 ms duration) |
| Vibration | |
| Operating | 1 g 10 Hz to 500 Hz |
| Non-operating | 2 g 10 Hz to 500 Hz |

The microprocessor is responsible for the control of the stepper motor used for head positioning. Fast seek times are achieved by the use of programmed velocity profiles and micro-stepped damping routines. Automatic thermal compensation has been built into the head positioning mechanism.

Figure 3:
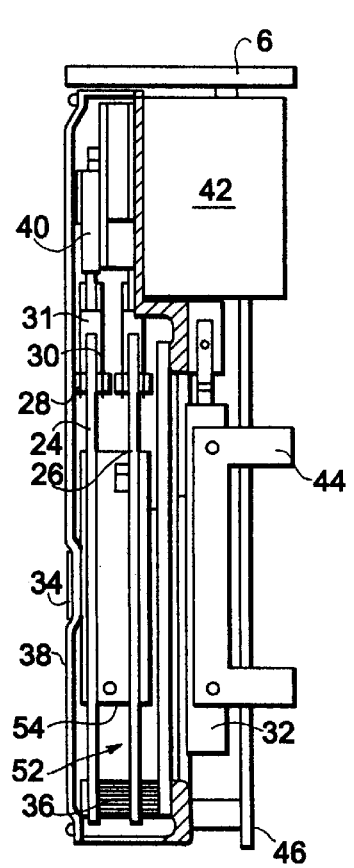
FIG. 3 is a sectional view of the disk drive system of the present invention.
Figure 5:
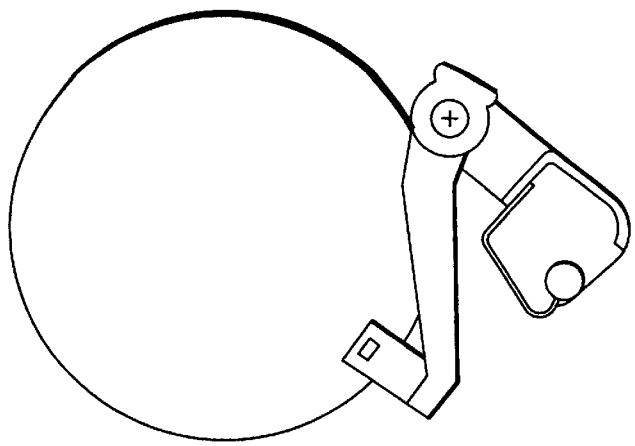
FIG. 5 is a schematic diagram of the positioning mechanism used in the Rodime 5¼ inch disk drive system.

A sectional view of the high capacity disk drive of the present invention is shown in FIG. 3. As can be seen therein, two micro-Winchester disks, 24 and 26, are arranged on the hub 54 of a dc motor 32 for rotation within the housing. Magnetic heads 28 and 30 are attached to support arms 31, which in turn are coupled to a stepper motor 42 through a drive band assembly 40 and a positioning arm 41. In addition, positioned within the "clean chamber" 52 is a flat cable flexible circuit 55 which includes the read/write, head select and pre-amplification circuitry for the drive. Such flat cable flexible circuitry serves as the electrical interface between the heads 28 and 30 and the circuit board 46 and may preferably be an SSI 117 IC.

High storage capacity is achieved because the disk drive system of the present invention records data on the disks at a rate of 7.5 Megabits per second using 2,7 RLL encoding with the disk rotating at 2,750 revolutions per minute. The recording rate, encoding scheme and rotational speed are a departure from the constraints of the industry standard ST 506 interface, and are possible by having an integral controller and SCSI host interface. Those parameters, when applied to a micro-Winchester disk drive system in accordance with the preferred embodiment of the present invention, provide a storage capacity of at least 10 Megabytes per disk.

A breather filter 34 is provided on the top cover 38 of the disk housing 50, adjacent to the center of the spindle of the dc motor 32. A recirculating filter 36 is located inside the chamber 52 at one corner in a suitable position in order to filter the flow of air resulting from the pumping effect of the rotating disks 24 and 26 when the disk drive is in operation. The top cover 38 seals the open face of the enclosure by means of a continuous gasket. The electronics board 46 is fixed to the base of the chamber 52, covering the full area (except for the stepper motor 42) of that face of the disk drive. The dc motor is fixed to the base of the chamber and is largely obscured from view by the electronics board 46.

Figure 4:
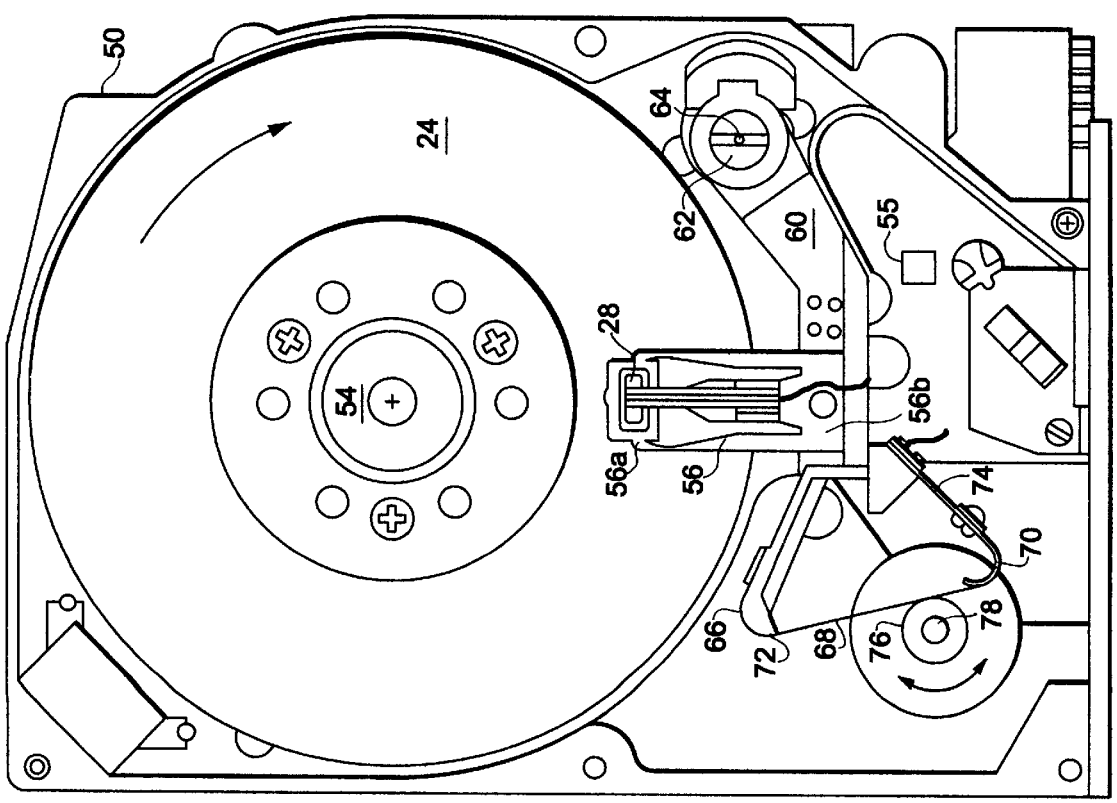
FIG. 4 is a plan view of the positioning system of the disk drive system of the present invention.

The positioning mechanism is shown in greater detail in FIG. 4. That positioning mechanism is mounted on the base of housing 50 within chamber 52 of the disk drive system. Chamber 52 is formed by chamber housing 50 and top cover 38. Winchester disk 24 is mounted on a hub assembly 54 within the chamber housing 52 so that it is rotated within the chamber by the dc motor 32.

The typical read/write magnetic head 28 is mounted on one end 56a of a flexure 56 which serves as the support arm. The other end 56b of flexure 56 is attached to a positioning arm 60. Flexure 56 is a thin rectangular stainless steel coil. Positioning arm 60 is coupled to a steel pivot shaft 62. That steel shaft 62 is fixed to the inner races of a pair of pre-loaded steel ball bearings (not shown), which in turn are located in the base of housing 50. Pivot shaft 62 rotates about a pivot axis 64. The side of the positioning arm 60 opposite from the shaft 62 has a curved portion 66. In addition, a steel spring arm 74 is attached to the positioning arm 60. A tensioned steel band 68 is wrapped around and attached to the steel pulley 76 mounted on the drive shaft 78 of the stepper motor. The stepper motor is fixed to the base of the housing 50. The two ends of the steel band, 70 and 72, are attached to arms 74 and 66 respectively.

By appropriately selecting materials of different coefficients of thermal expansion for the various components of the positioning mechanism, it is possible to provide thermal compensation so as to ensure that the read/write heads remain on track irrespective of thermal effects. For such purposes, three different classes of materials are utilized. The first class of material is an aluminum/bronze alloy; the second class of material is stainless steel; and the third class of material is aluminum.

The principal components of the thermal compensation system and their preferred materials are: disk 24 (wrought aluminum); housing 50 (die cast aluminum alloy LM 2); positioning arm 60 (aluminum/bronze alloy); metal band 68 (Sandvik 11 R 51 steel); and flexure support 56 (AISI 301 stainless steel). The dimensions and arrangement of these various components are such that, in response to changes in temperature, the various materials expand or contract in such a way that the support arm (flexure) effectively rotates via the positioning arm and the pivot shaft so as to maintain the typical read/write head substantially at its original track position.

There are two thermal "circuits" effectively controlling the positioning of the read/write head 28 to a track on the disk 24 consisting of a primary thermal circuit and a compensating thermal circuit. The primary thermal circuit operates in chamber 52 and links the track on the disk 24 to the hub 54, to the motor 32, to the base of housing 50, to the bearings for shaft 62, to the shaft 62, to the arm 60, to the flexure 56, and to the read/write head 28. The compensating circuit also operates in chamber 52 and links the arm 60 to the band 68, to the pulley 76, to the stepper motor shaft 78, to the stepper motor, to the base of housing 50, to the bearings for shaft 62, to shaft 62 and to the arm 60. The primary thermal circuit and the compensating thermal circuit have arm 60, pivot shaft 62, housing 50 and the circulating air in chamber 52 in common.

Whenever there is a temperature change, the primary thermal circuit in chamber 52 results in a misposition of head 28 relative to a track on the disk 24. However, the compensating circuit of the chamber 52 causes the shaft 62 to rotate in such a way as to substantially move the read/write head 28 to its original position relative to the disk. That operation is described more fully below.

A temperature change in chamber 52 causes the read/write head 28 to move relative to a track on the disk 24 because of varying contributions from flexure 56, housing 50 and the positioning arm 60 in the primary thermal circuit. The resulting mis-position varies according to track position (proportional to the angle of shaft 62 and the arm 60 relative to the "line" drawn between the center of the hub 54 and the shaft axis 64). As the temperature rises, the head on average mispositions inwardly from the track center line.

The compensating thermal circuit in chamber 52 acts to reduce that misposition to acceptable proportions for all track positions. With temperature changes, the various components of the compensating circuit vary in length relative to each other. A change in geometry causes rotation of the arm 60 about the axis of the shaft 62, thus compensating for the read/write head 28 and the disk 24 misposition over the prescribed track position and temperature range of the disk drive.

The dc motor 32 is a brushless 2-phase external rotor dc motor with integral hub. Commutation is effected by a Hall sensor. A spare Hall sensor is provided in the motor and may be activated in the event that the first Hall element fails. The motor uses reloaded ABEC 7 bearings and is balanced in two planes to better than 0.25 grams centimeters. A ferrofluidic seal is fitted above the top bearing. The disk hub 54 is grounded to the electronics board 46 by the motor shaft and a button contact in order to prevent build-up of static charge on the rotating disks.

The high capacity disk drive of the present invention is not fitted with a separate transducer for generating an index pulse. Instead, the Hall generator in the dc motor is used although it provides two identical pulses per disk revolution. A unique pulse is selected during the power-up sequence by a routine in the microprocessor which detects a pre-recorded data burst. The index/Hall phase which is active when the data burst is detected is thus automatically selected. The disks 24 and 26 are rotated at a speed of 2746 plus or minus 27 r.p.m.

Figure 6:
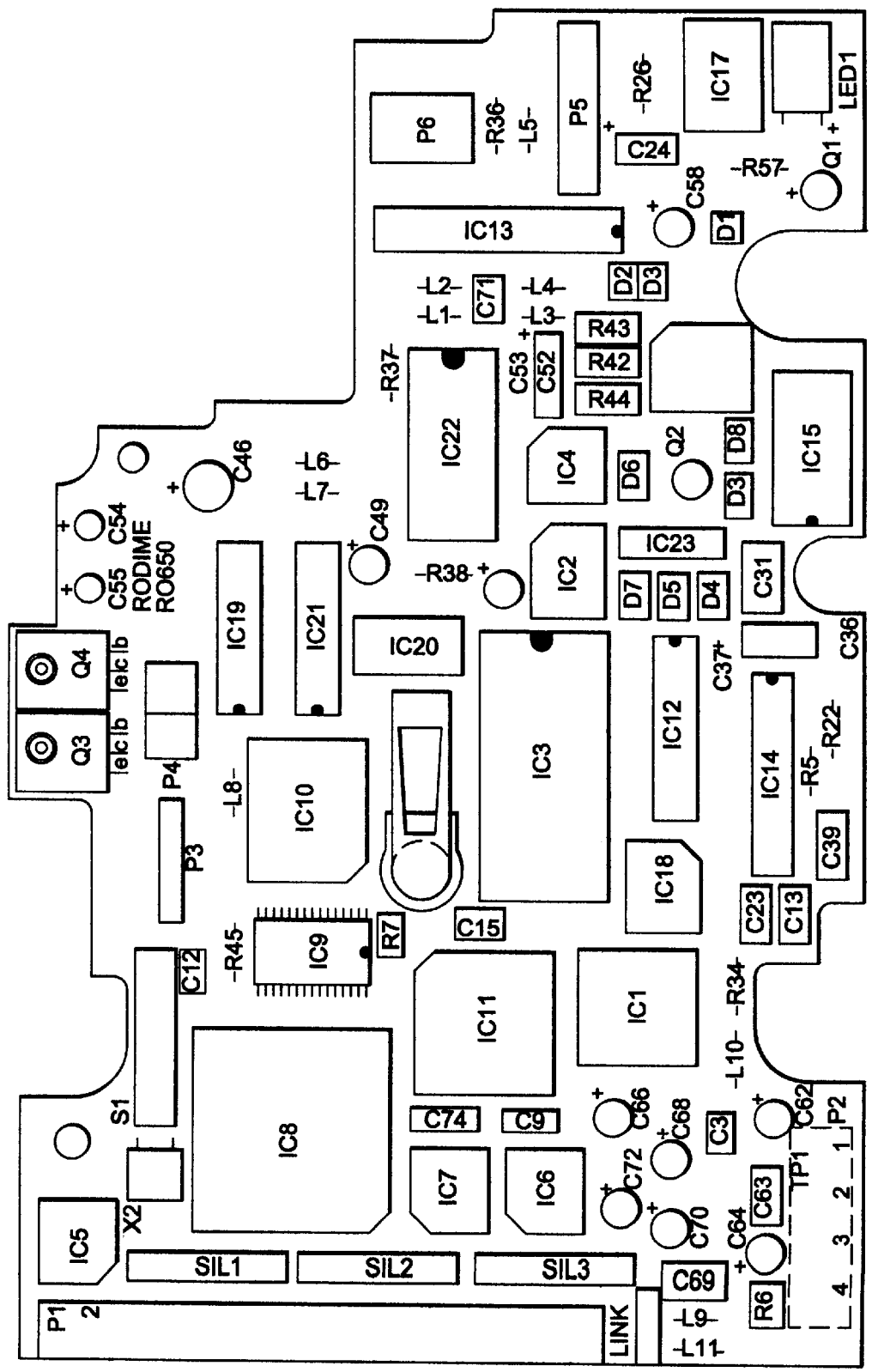
FIG. 6 is a diagram of an embodiment of a printed circuit board for use with the disk drive of the present invention.

The electronics developed for the high capacity micro-Winchester disk drive system of the present invention were designed primarily as large scale integrated circuits (LSI) that are placed on a single printed circuit board (with the exception of the pre-amplification, read/write and head circuitry), as shown in FIG. 6. The use of only a single printed circuit board whose dimensions lie within the outline dimensions of the housing 50 is particularly beneficial in enabling the dual anti-vibrational mounting arrangement of the present invention to be utilized for mounting the high capacity micro-Winchester disk drive system in the space normally provided for a 5¼ inch disk drive system. Consequently, an extremely rugged, low weight, high capacity hard disk drive system is provided for use in a portable computer.

Furthermore, the development of such a single printed circuit board electronic control circuit in the high capacity micro-Winchester disk drive system has enabled the power consumption and dissipation to be significantly reduced. For example, the electronic circuits in the preferred embodiment provide heat dissipation at a rate of between 9 and 13 watts as compared to 25 watts typically dissipated by a 5¼ inch Winchester disk drive system. Thus, the high capacity micro-Winchester disk drive system of the present invention dissipates a relatively small amount of heat into the computer system. That enables a portable computer to utilize either a smaller fan or to entirely eliminate the use of a fan for removing heat from the system.

The electronic control circuits for the high capacity disk drive system are shown in the schematic diagrams of FIGS. 8–14. Those diagrams are described further below. However, before describing those circuits, reference is made to FIG. 7, which shows the organizational layout of the preferred embodiment of the present invention.

Figure 7A:
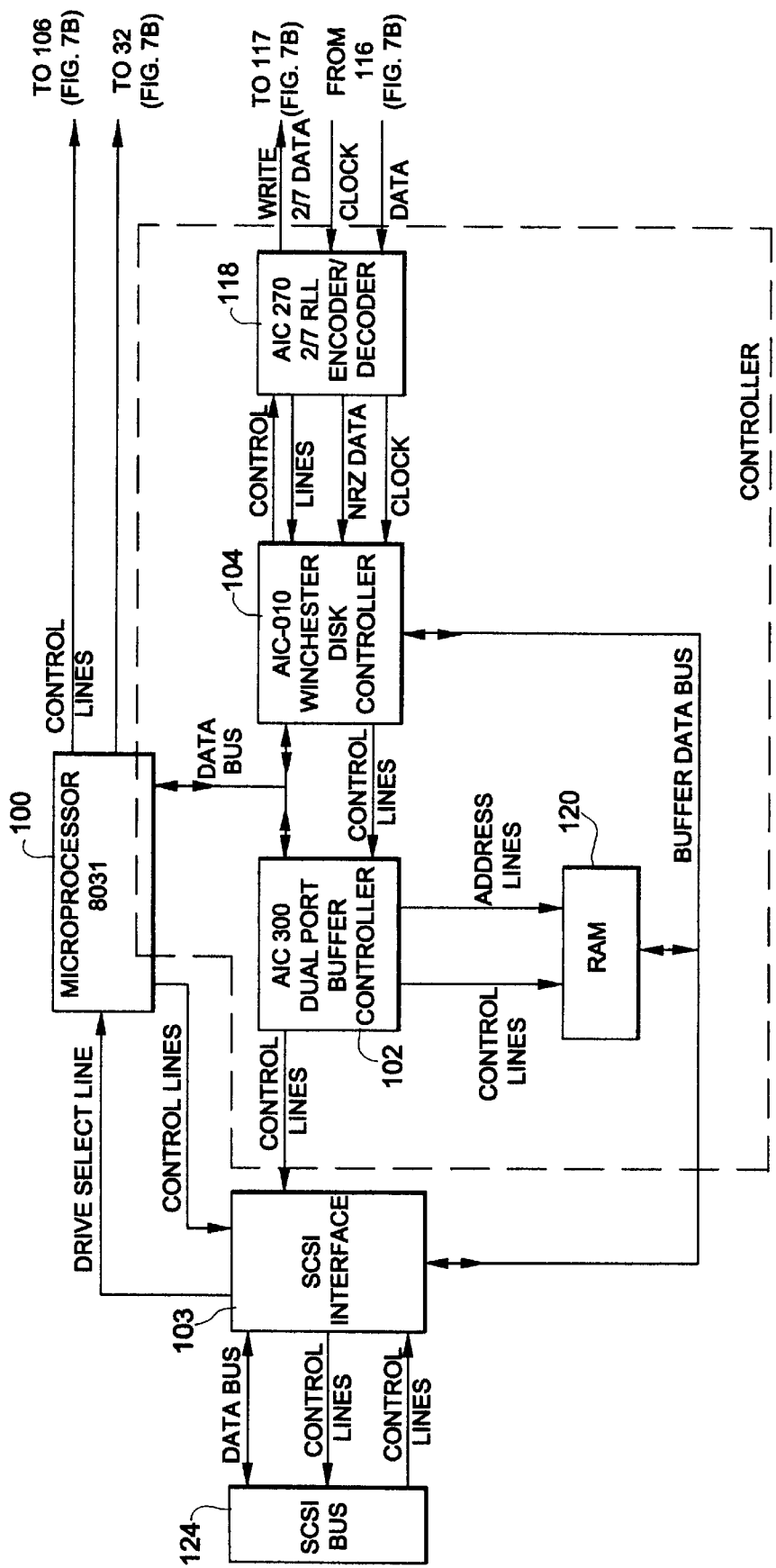
FIG. 7 is a schematic block diagram showing the organization of the electronic control circuit for the disk drive system of the present invention.
Figure 7B:
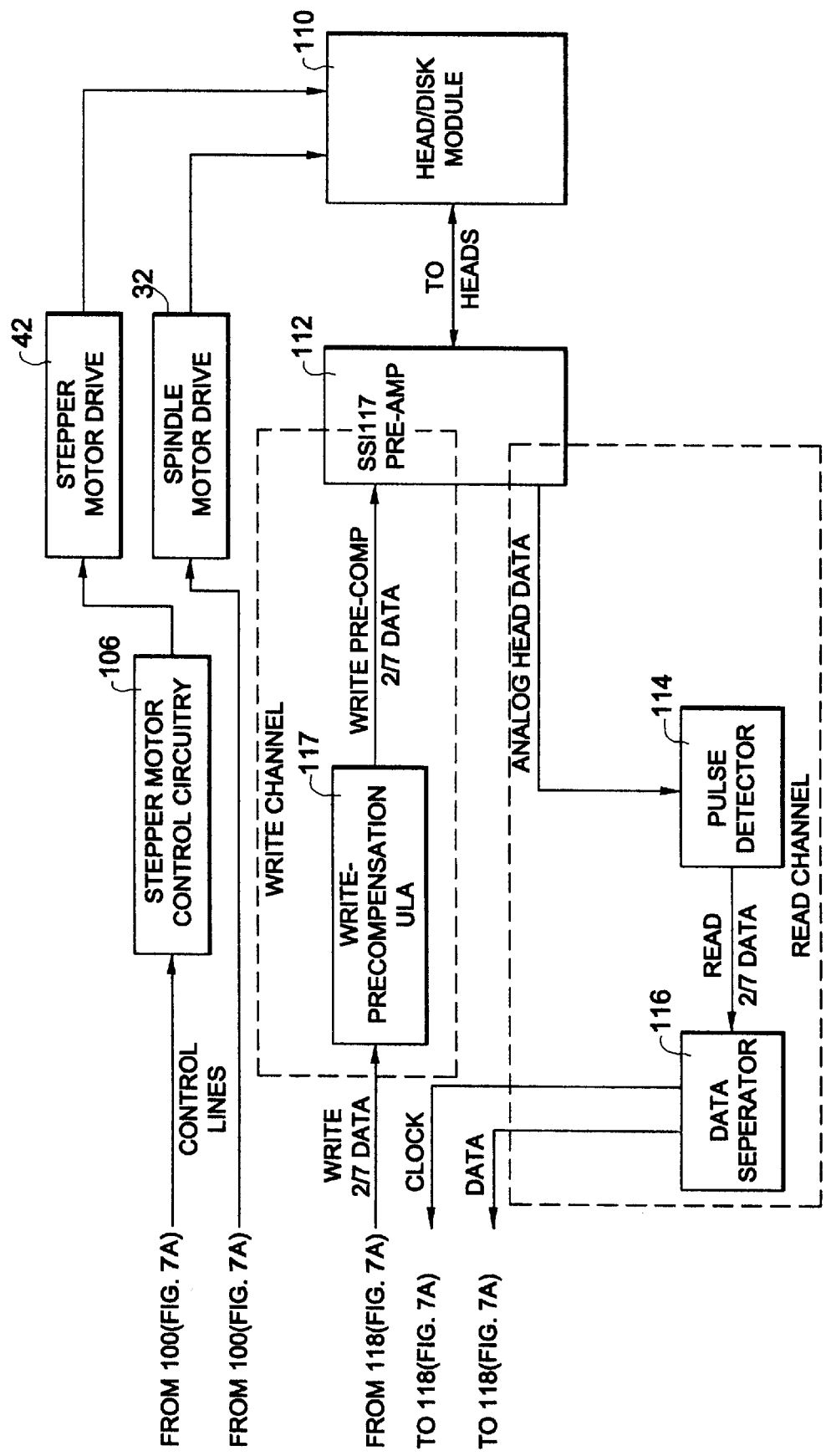
Figure 8A:
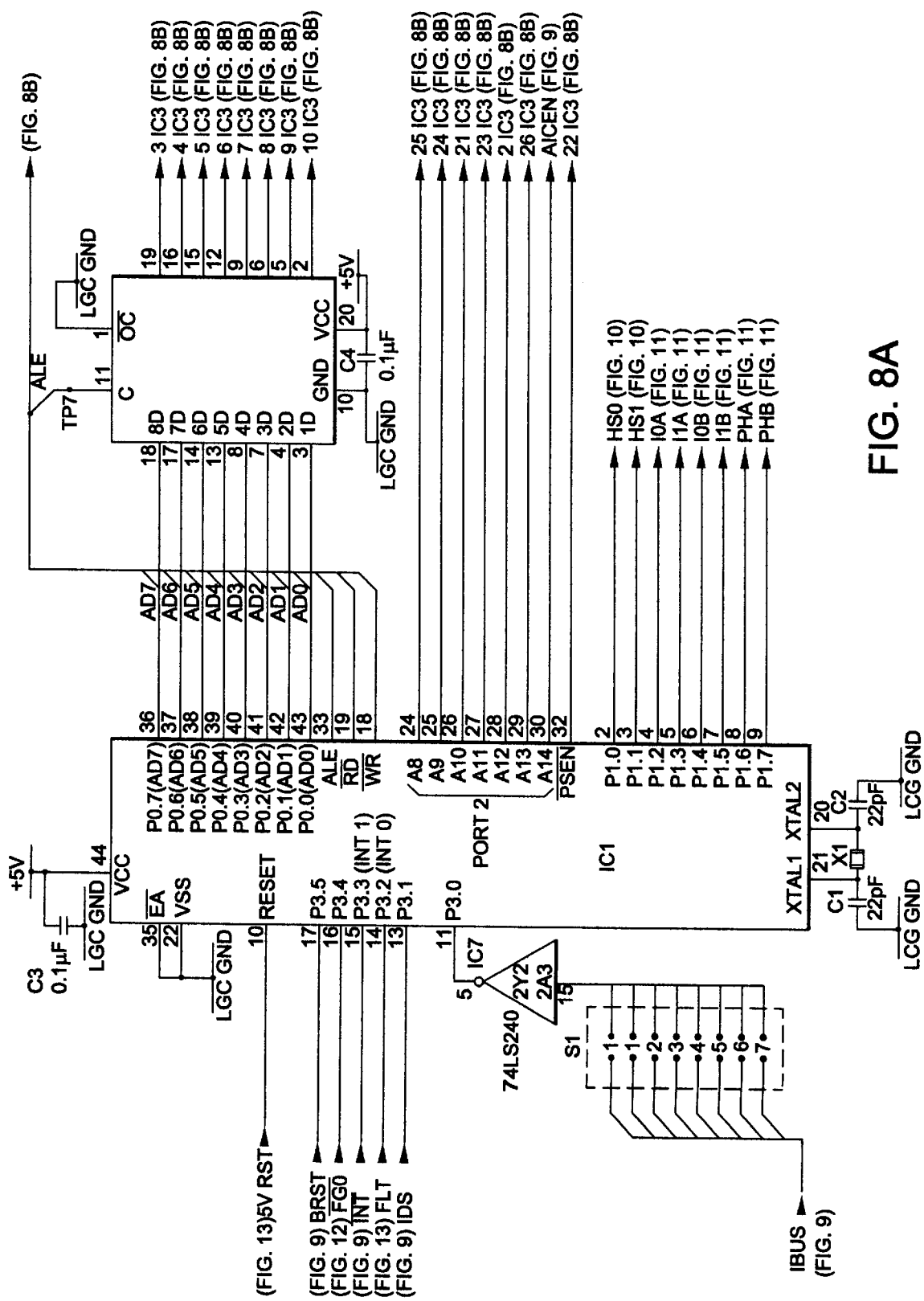
Figure 8B:
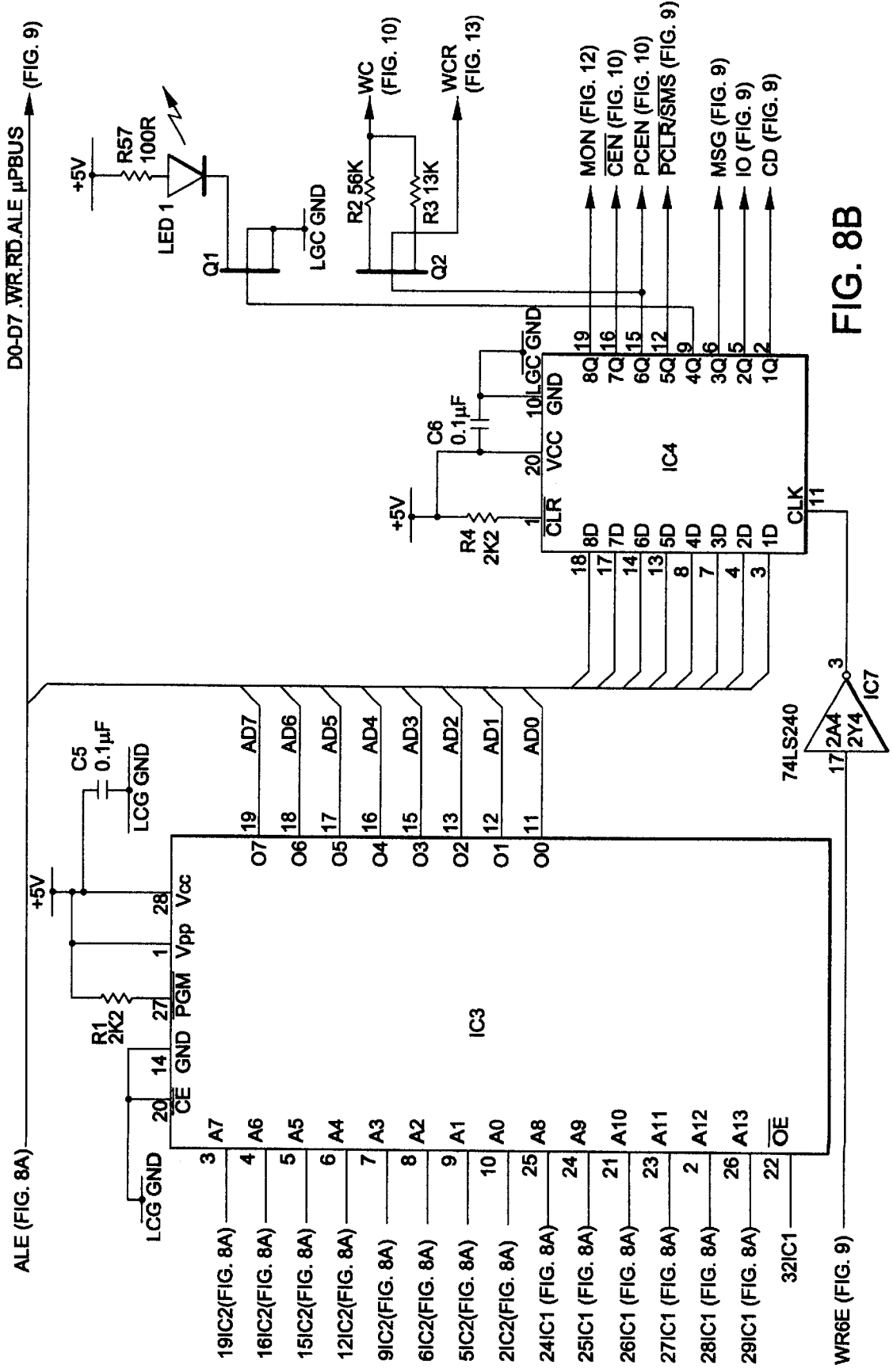
Figure 9A:
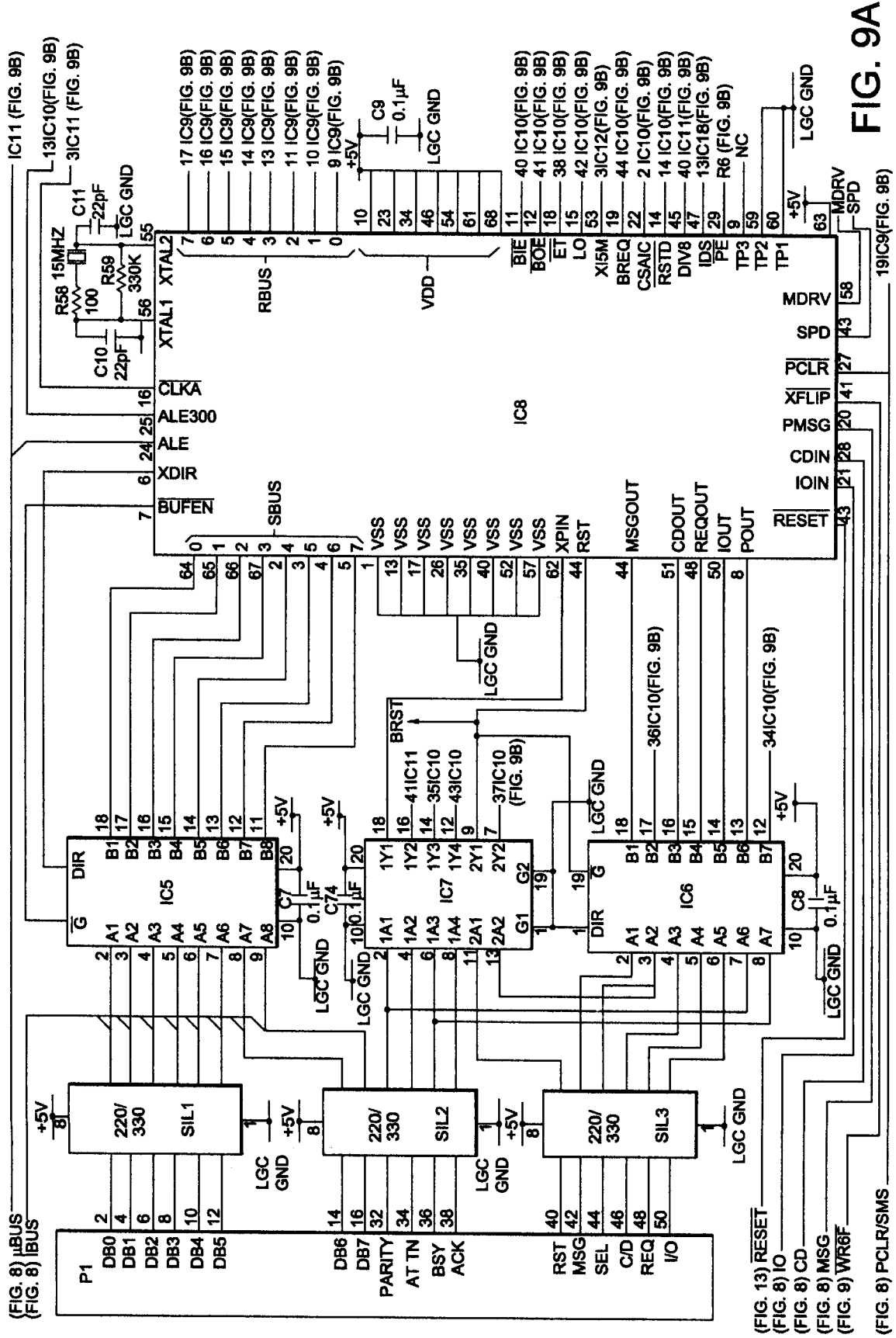
Figure 9B:
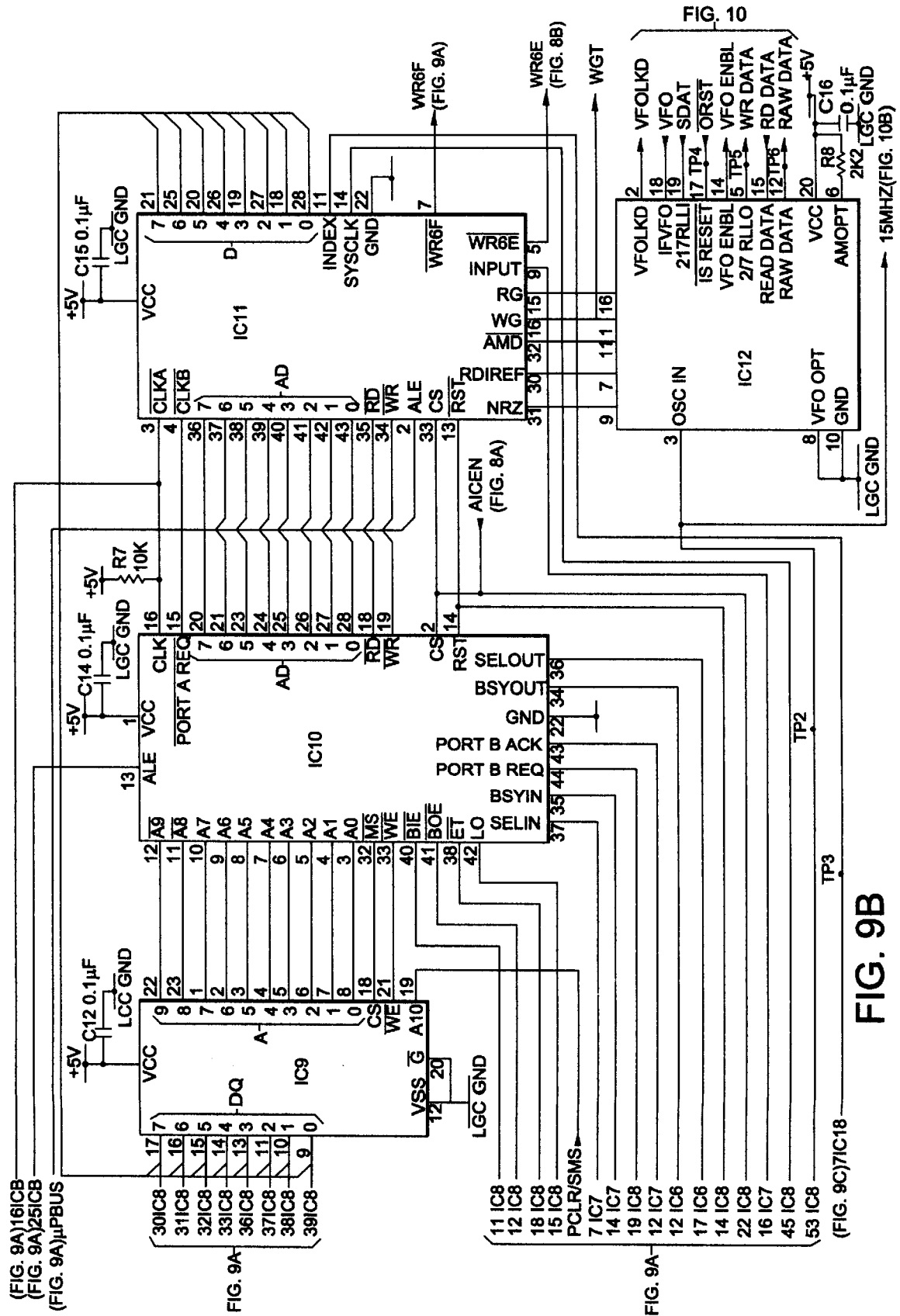
Figure 9C:
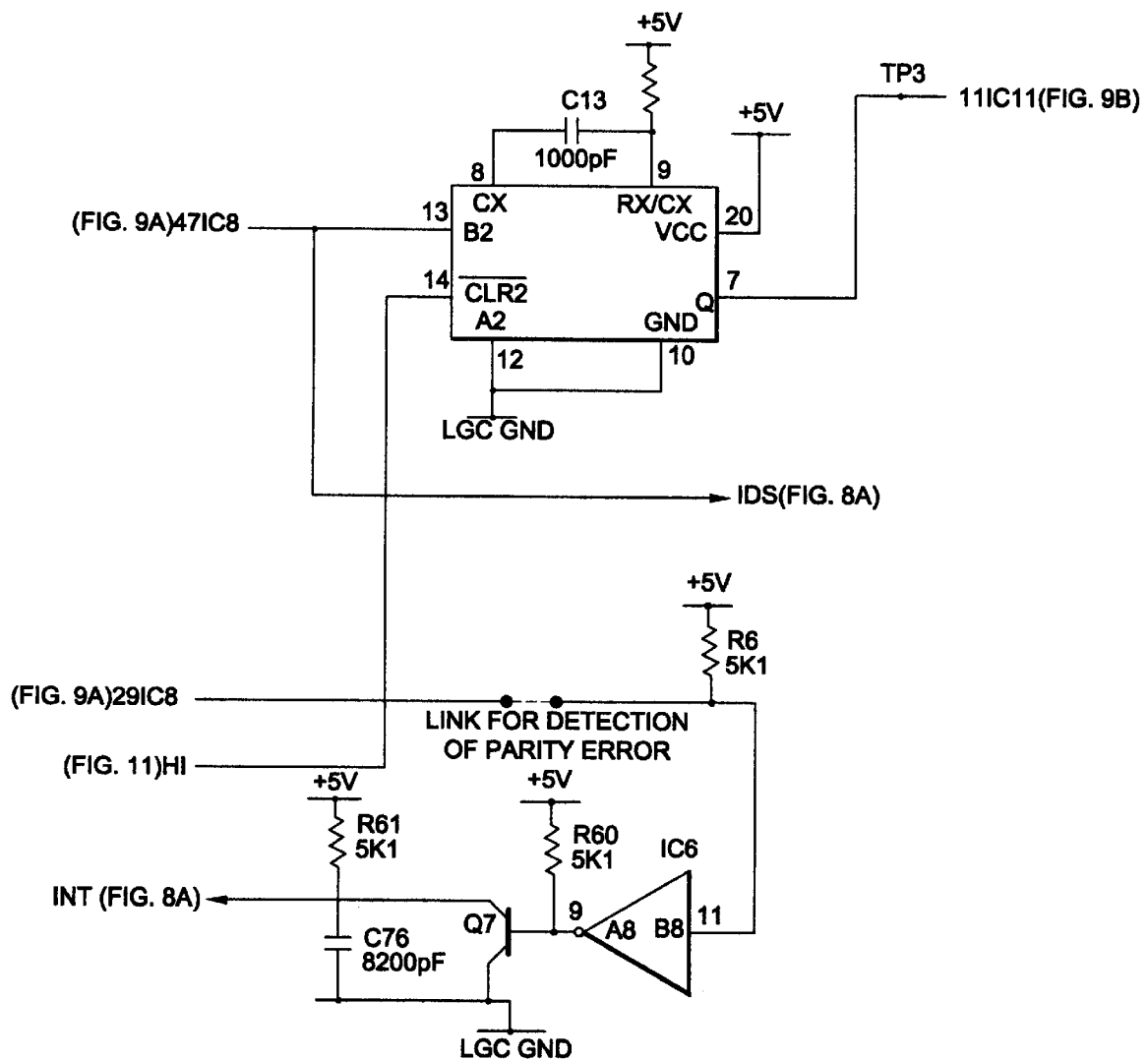
Figure 10A:
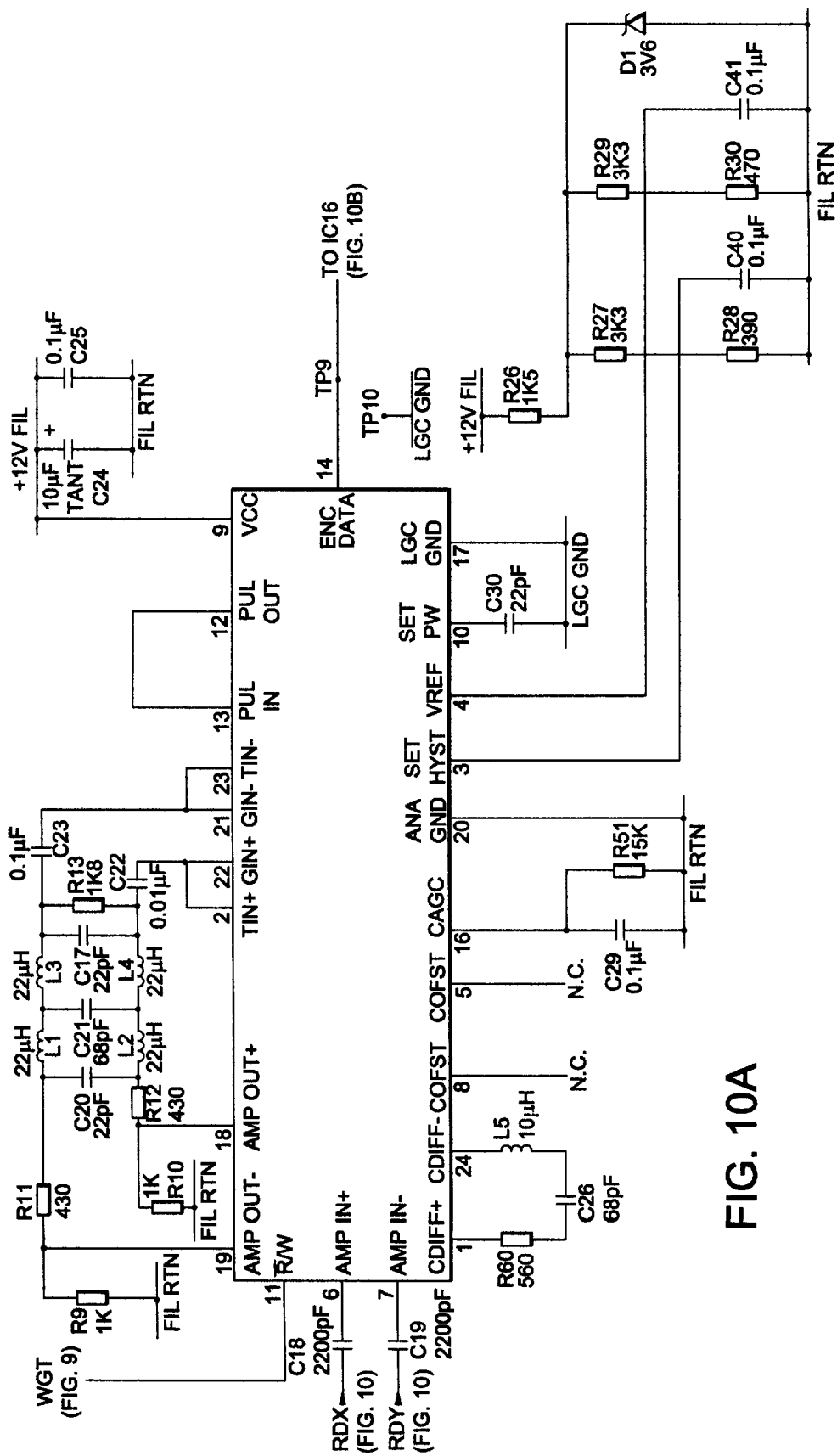
Figure 10B:
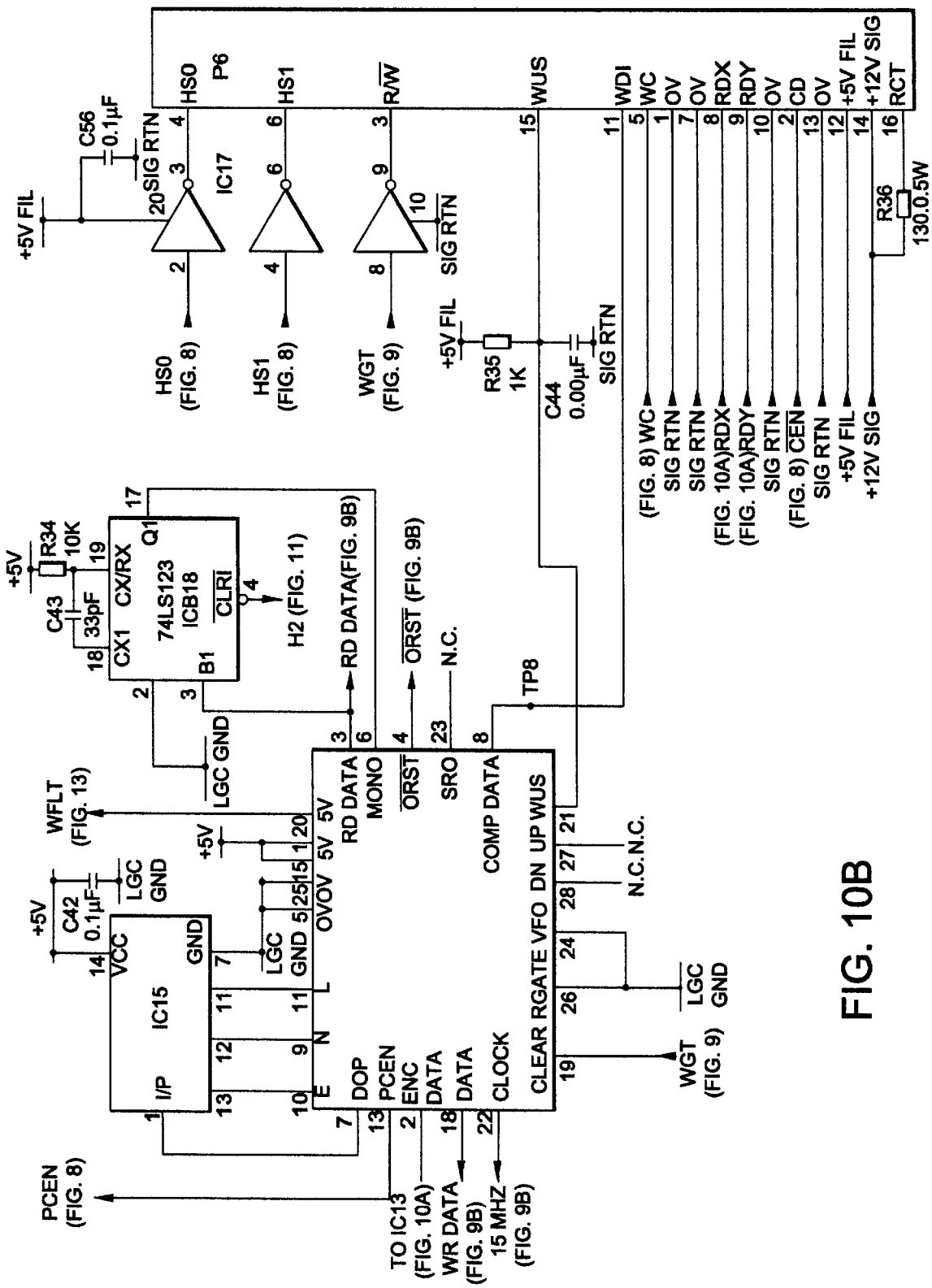
Figure 10C:
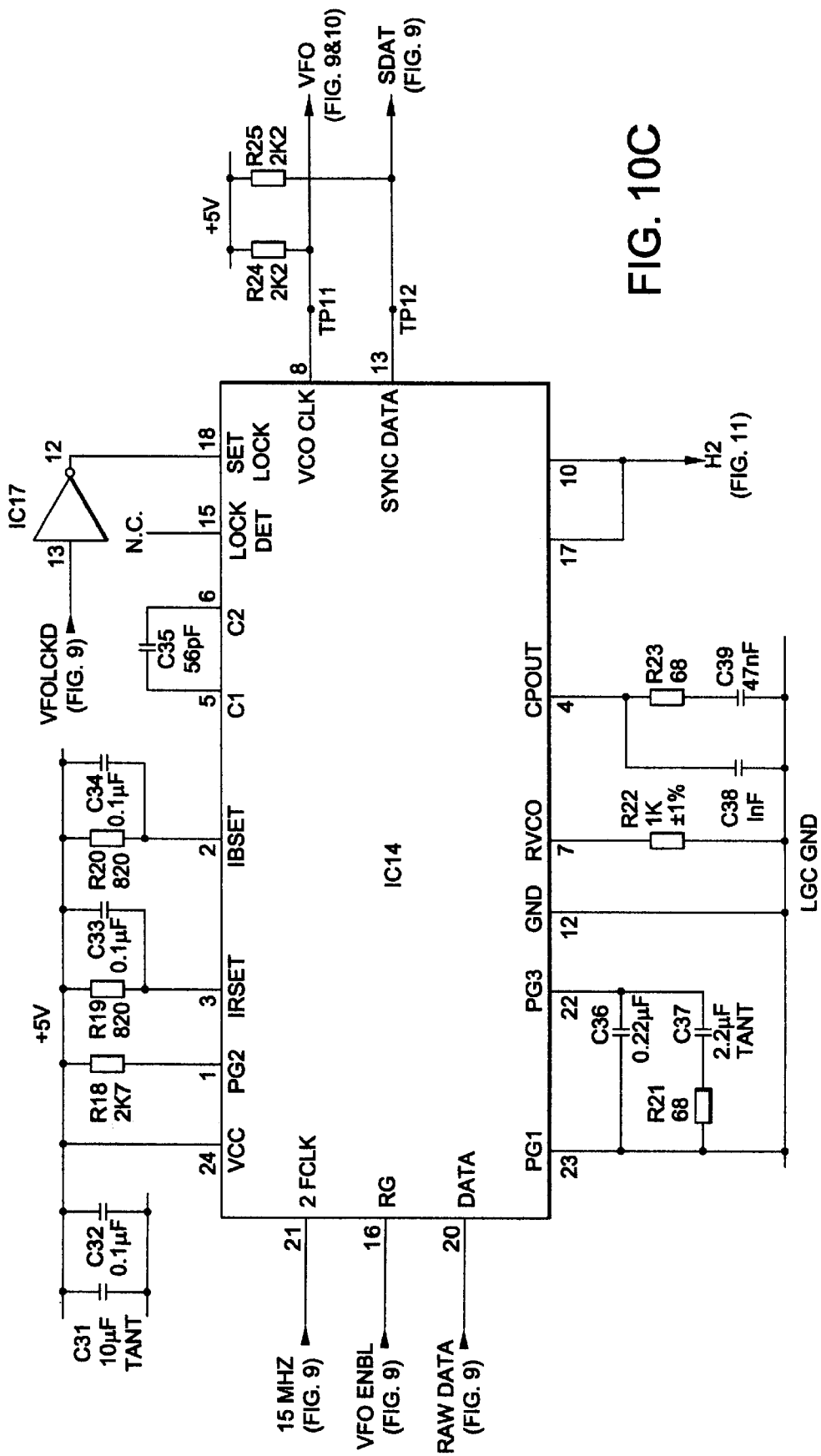
Figure 12:
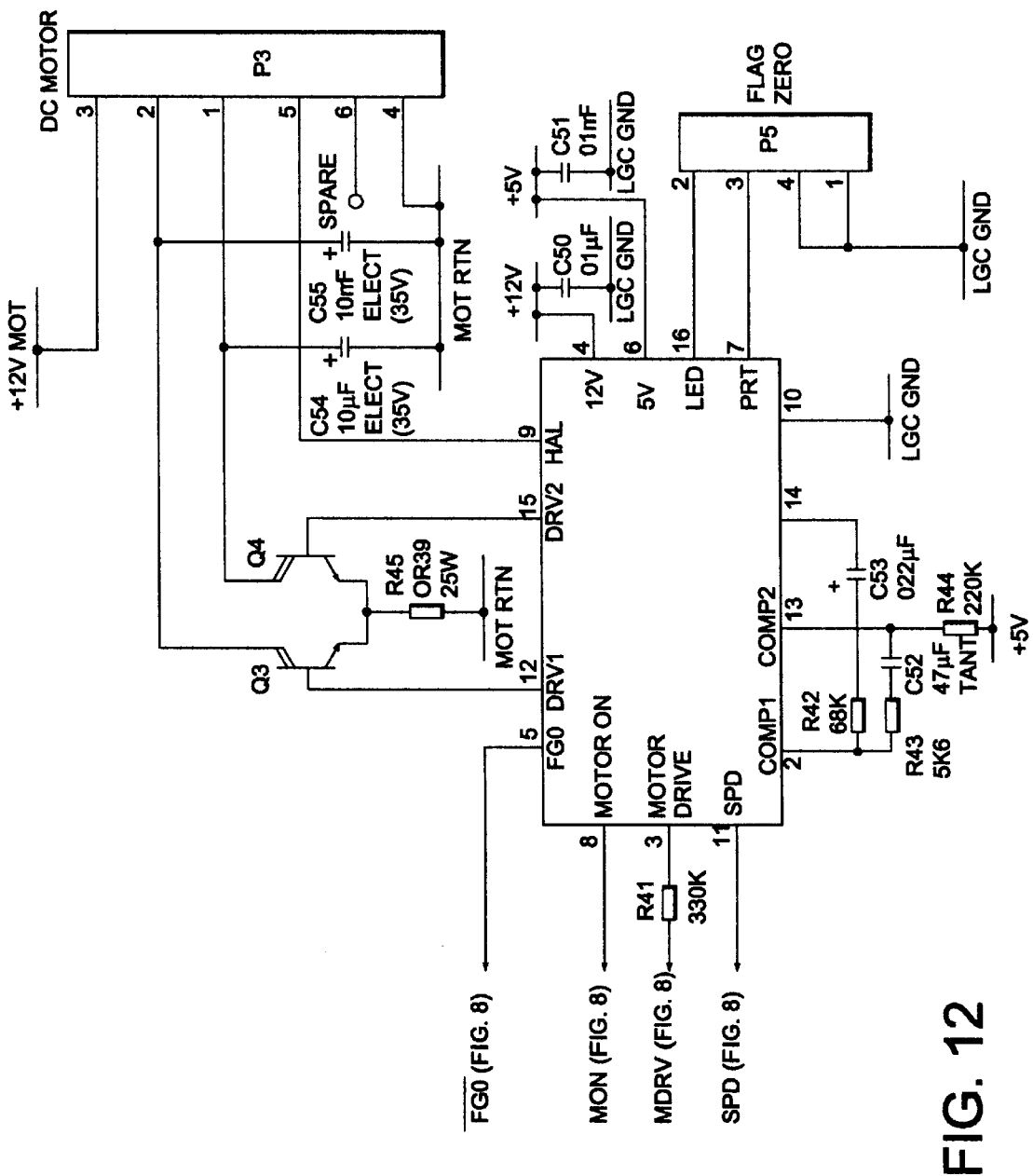
Figure 13:
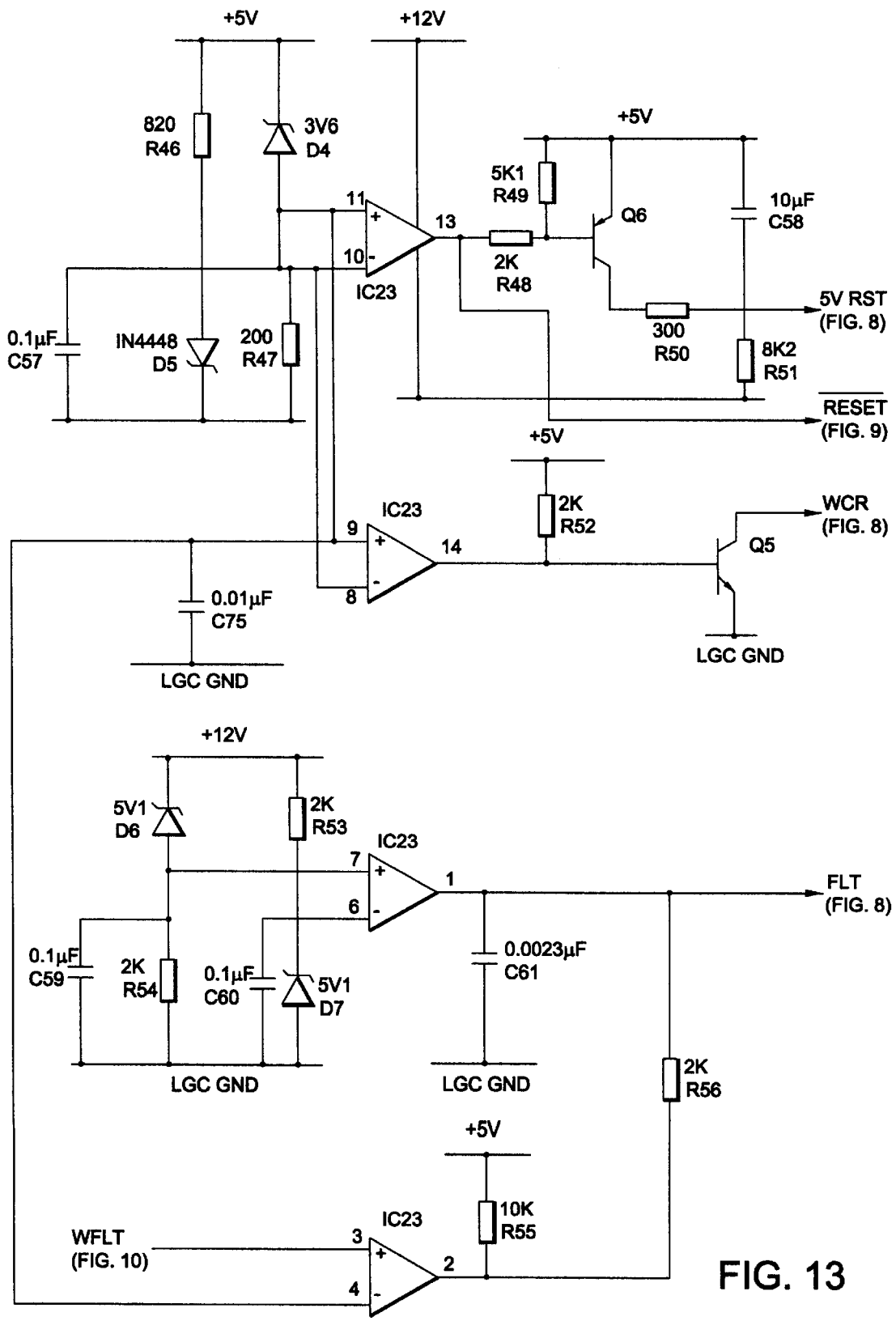
Figure 14:
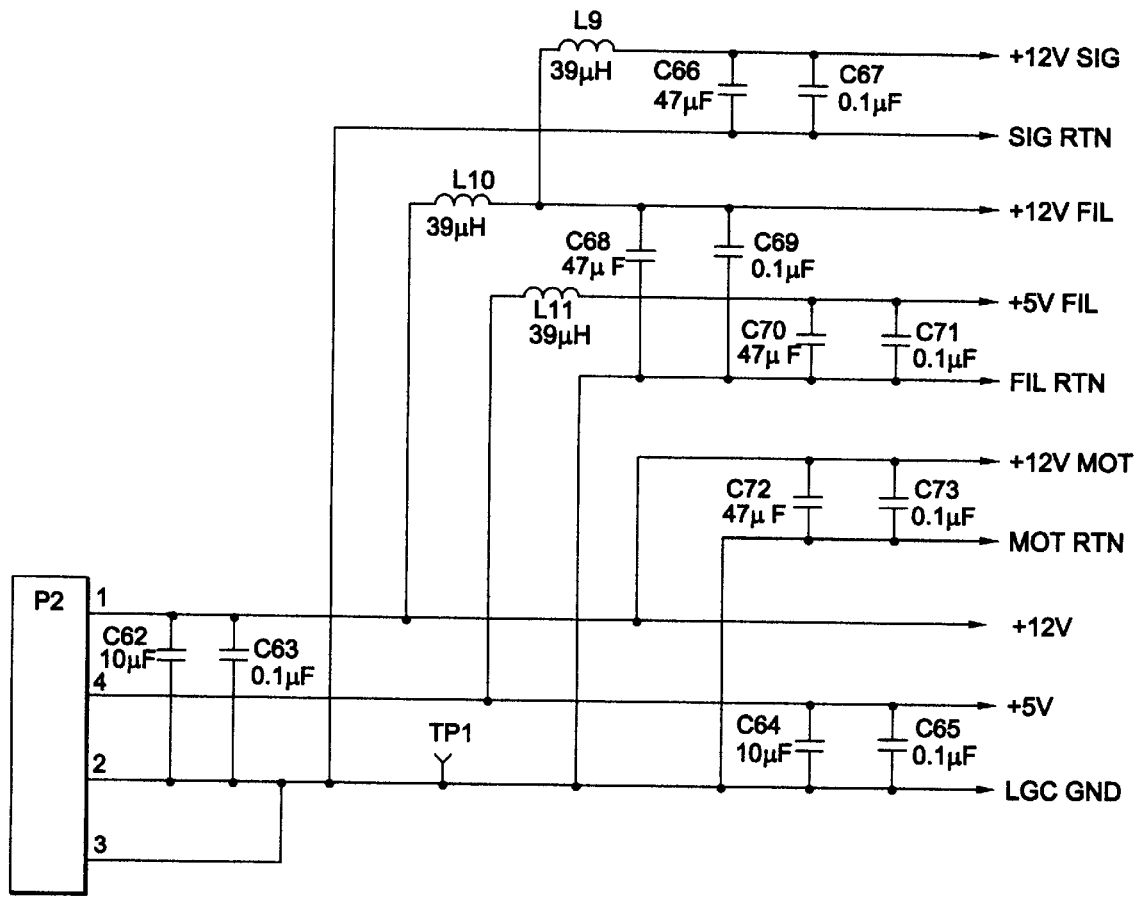

As shown in FIG. 7, a microprocessor 100 is used to control all drive and interface functions. The microprocessor 100 is connected via a microprocessor data bus to both Dual Part Buffer Controller 102 and the disk controller 104. The microprocessor 100 is connected to control both the stepper motor drive 42 and control circuitry 106 and the spindle motor drive 32, both of which drives are connected in the usual manner to the head/disk module 110. The microprocessor 100 is also connected to control the SCSI Interface 103.

Data read from the magnetic disks 24 and 26 is preamplified by head preamplifier 112 and fed through disk pulse detector 114 and data separator 116 to encoder/decoder 118. The disk pulse detector 114 amplifies, filters and then differentiates the data signals received from the heads 28 and 30. Its output is a TTL compatible signal which, on the positive leading edge, indicates a signal peak. Electrically, those peaks correspond to the 1's or flux reversals recorded on the disks 24 and 26.

The output of the disk pulse detector 114 is fed to the data separator logic 116. After locking onto the frequency of the input pulses, the data separator 116 separates them into synchronized data and clock signals. The data separator is able to lock onto the receiving preamble data pattern extremely quickly, such that lock indication occurs within four bytes.

The encoder/decoder 118, which receives the output from the data separator 116, is an LSI device which provides an efficient interface between the NRZ data required by the disk controller 104 and the 2,7 RLL recording code used in the disk drive. This chip may preferably be an AIC-270, manufactured by Adaptec. Such chip performs all of the functions necessary to convert the NRZ data to and from the 2,7 RLL data. It also incorporates address mark generation and detection logic.

The encoder/decoder is connected via data lines to the disk controller 104. The disk controller 104 is connected via a high-speed buffered data bus to both the data buffer RAM 120, the Dual Port Buffer Controller 102 and the SCSI Interface 103. The encoder/decoder 118 is also connected, through the SCSI Interface 103 to the data port of the SCSI bus 124. The microprocessor 100, the disk controller 104 and the SCSI bus controller 102 perform the controller logic function for the disk drive system. Both the disk controller 104 and the SCSI bus controller 102 are initialized and monitored by the microprocessor 100. The microprocessor is used to maintain "loose" synchronization with the real time operation of the disk through registers in the disk controller 104. Based upon the real-time events occurring on the disk, the microprocessor also sets up the registers in the SCSI bus controller 102, in order to control data transfers to and from the RAM 120.

The microprocessor 100 also performs the following functions: recalibrates the disk drive to Track φ; monitors for fault conditions; selects the appropriate head; seeks to the desired cylinder; reads the command data block sent by the host computer and then performs the operations necessary for the command to be executed; and sends status reports back to the host computer via the SCSI bus 124. A flow chart showing the design of a program for operating the microprocessor 100 is set forth in FIG. 15. That program is stored in an EPROM contained within the electronic circuitry of the disk drive system.

The disk controller 104 performs the basic read/write functions. It may preferably be an AIC-O1OL Winchester Disk Controller chip, manufactured by Adaptec. That chip provides the necessary serialization, de-serialization, formatting, ECC generation and correction functions. In addition, the disk controller 104 has search and verify capabilities. The disk controller 104 is connected through the encoder/decoder 118 to a write precompensation circuit 117. That circuit, which may be a semi-custom chip (ULA), model number 5RAφ97Q1, manufactured by Ferranti Electronics Limited, provides precompensation to the 2,7 RLL encoded data stream prior to its application to the preamplifier 112 and then to the heads 28 and 30.

The SCSI bus controller 102 is designed to simplify the buffering and increase the throughput of data blocks. It may preferably be an AIC-300L dual port buffer controller IC manufactured by Adaptec. It allows low cost static RAM to be used as a dual port circuit or FIFO, supervises data transfers to the data buffer 120, reduces the possibility of host overruns and allows for very high speed direct memory access (DMA) transfers. During read/write operations, the disk controller RAM requests and the SCSI bus RAM requests are arbitrated by the SCSI bus controller 102 to ensure that the maximum transfer rate between the disk and the SCSI interface is maintained.

The microprocessor 100 supervises the operation of the disk controller 104 and the SCSI bus controller 102, allocating buffer space, starting and stopping the two controllers, and implementing operation of the ECC correction logic. SCSI interface command decoding, logical address conversion to cylinder, disk format and multi-block read/write control are also implemented by the microprocessor. In addition, all of the normal functions required by an ST 506 drive are performed. Seek implementation, spindle motor speed, checking and verification and general housekeeping are likewise performed by the microprocessor 100.

Referring now to the circuit diagrams in FIGS. 8–14, there is shown therein IC-1, which is an 8031 microprocessor used to control all drive logic and controller logic functions, as described above. It is connected to IC-2, which may be an SN74LS373FN octal D-type transparent latch, which is used to pick-up and latch the least significant byte of the address from the multiplexed data bus received from the microprocessor.

The latch IC-2 is connected to a 2764 EPROM IC-3, as is the microprocessor IC-1. That memory is used to store the software program for the microprocessor.

Both the microprocessor IC-1 and the EPROM IC-3 are connected to a second octal D-type latch IC-4, which may be the same integrated circuit as IC-2. That latch is used to pick up and latch data from the multiplexed bus. IC-5 may be an SN74ALS638-1FN octal bus transceiver chip and is used to buffer data signals to and from the SCSI bus. IC-6 is a similar octal bus transceiver and is used to buffer control signals onto the SCSI bus.

IC-7 is an SN74LS240 octal buffer integrated circuit which buffers the control signals from the SCSI bus. IC's 5, 6 and 7 are connected to IC-8 which is a semi-custom chip, part number LSAφ132 manufactured by LSI Logic Corporation. IC-8 is used to control the interface between the drive and the SCSI bus. It also handles the generation of system clocks and other peripheral functions.

IC-9, which is connected to receive an output from IC-8, is a 2K×8 static RAM chip which is used to store data from the disk or SCSI bus and may preferably be an HM6116FP integrated circuit device.

Static RAM chip IC-9 is also connected to a dual port buffer controller IC-10, which may be an AIC-300L device made by Adaptec. IC-10 allows the static RAM chip IC-9 to be utilized as a dual port circular FIFO, supervises data transfers to that RAM, and allows for high speed DMA transfers.

The dual port buffer controller IC-10 is connected to IC-11, which may be an AIC-O1OL Winchester disk controller, and is also manufactured by Adaptec. IC-11 performs the basic read/write functions for the drive of the present invention. For that purpose, IC-11 provides the necessary serialization/de-serialization, formatting, ECC generation and correction functions. In addition, the Winchester disk controller chip also has search and verify capabilities.

IC-12 is a 2,7 RLL encoder/decoder device. It may preferably be an AIC-270 IC, manufactured by Adaptec. IC-12 performs all of the functions necessary to convert the incoming NRZ coded data to and from the 2,7 RLL data as written to and read from the disks.

The disk pulse detector IC-13 may preferably be a DP8464B integrated circuit. It produces a TTL compatible output which, on the positive leading edge, indicates a signal peak was present at the read/write amplifier inputs to the chip.

The data separator device IC-14, which may preferably be a DP8465 integrated circuit, receives the output from the digital pulse detector circuit IC-13. After locking onto the frequency of those input pulses, it separates them into synchronized data and clock signals. IC-15, which is connected to IC-16, is a delay line with five nanosecond taps. Integrated circuit 16 is a semi-custom chip, part number 5RAφ97Q1, manufactured by Ferranti Electronics Limited, which is used to apply write precompensation to the write data stream. It also provides other peripheral functions.

Integrated circuit 17 is an SN74LS04FN hex inverter circuit. It is used to buffer the data to the head amplifier.

IC-18 is an SN74LS123FN dual retriggerable monostable device. One of those monostables is used to provide the index pulse and the other is part of the sync field detection logic.

IC-19 and IC-21 are PBL3717 RIFA devices. They are used to drive the stepper motor 42.

IC-20 is connected to both of the stepper motor driver chips IC-19 and IC-21 and is a custom hybrid chip which provides filtering for those chips.

IC-22 is a custom hybrid device which provides motor control logic for the DC motor 32.

IC-23 is an LM 339 quad comparator device. It is used to monitor the power supplies and to provide protection against the corruption of data on power-up of the disk drive of the present invention.

The concept of RLL codes is believed to be well known. Such codes, in the disk drive arena, serve such purposes as furnishing adequate clocking information in the read-back signal; minimizing flux reversal density for a given bit density; allowing an adequate clocking window for the reliable timing of the read-back data; and provide the capability of being encoded and decoded reliably and economically.

The normal code designation for RLL code is (D,K), here D is the minimum number of consecutive zeros and K is the maximum number of consecutive zeros. The full designation of the RLL code is (D,K; M,N; R); where D and K have the meaning set forth above and M is equal to the minimum number of data bits to be encoded, N is equal to the number of code bits for each M data its and R is equal to the number of different word lengths in a variable word length code.

The density ratio DR or data bits per flux reversal is equal to (D+1) which is equal to bits per inch divided by the flux changes per inch. The frequency ratio FR, or the ratio of maximum to minimum time between transitions is equal to K+1/D+1 which, when using 2,7 coding, is equal to 8/3.

A code conversion table for 2,7 code is as follows:

| Original or Decoded Words | Encoded Words |
| --- | --- |
| 11XX | 0100XXXX |
| 10XX | 1000XXXX |
| 011X | 000100XX |
| 010X | 001000XX |
| 000X | 100100XX |
| 0011 | 00100100 |
| 0010 | 00001000 | where X may be either a 1 or a zero and (D,K; M,N; R) equals (2,7; 2,4; 3).

The high capacity disk drive system of the present invention supports the standard SCSI features. It uses a 2 kilobyte dual ported FIFO data buffer for rapid data transfers and is completely host software device independent. A 32 bit ECC is utilized which provides correction of single burst errors of 4 bits. ID and data fields are ECC protected. The instant disk drive system supports multiple host and multiple controller systems, but is not an arbitrating SCSI bus device.

The onboard microprocessor utilizes 8K bytes of memory contained in the 2764 EPROM to control several drive functions and all stepper motor control functions. These include Ramp up/Ramp down for multi-track seeks and micro-stepped electronic damping routines. The microprocessor also performs all disk controller functions, as described hereinbefore, in conjunction with the disk controller, encoder/decoder and dual port buffer controller dedicated VLSI devices. A bidirectional 8 bit parallel interface is utilized for connection to the host computer.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A hard-disk drive unit having predetermined overall dimensions for use with a host computer, said drive unit comprising:

at least two micro-hard disks, each disk having a diameter equal to or less than 96 mm and having a plurality of concentric tracks having a density of at least 600 tracks per inch, said at least one micro-hard disk having a formatted storage capacity of at least 10 mb and an unformatted storage capacity of at least 12.5 mb;

a housing of predetermined size positioned within the confines of said overall dimensions, said overall dimensions corresponding substantially to the dimensions of a 3½" micro-Winchester hard-disk drive, said housing including an interior compartment having a width substantially the same as the diameter of at least one of said micro-hard disks, and sized so that said micro-hard disks occupy a substantial portion of said compartment;

a motor mounted within and surrounded by said housing, said motor having a rotatable hub-positioned within said compartment of said housing, said at least two disks being supported on said hub for rotation with said rotatable shaft;

transducer means positioned within and surrounded by said compartment of said housing for writing serial digital data onto and reading serial digital data from said micro-hard disks;

means positioned within and surrounded by said compartment of said housing for moving said transducer means across the tracks on said micro-hard disks;

recovering means for recovering from said transducer means said serial digital data written on said micro-hard disk;

a 2,7 RLL encoder/decoder having a first input for receiving NRZ encoded data, a first output for providing thereat 2,7 RLL coded data, a second input for receiving 2,7 RLL coded data, and a second output for providing decoded NRZ data, said 2,7 RLL encoder/decoder encoding the NRZ data received at said first input and providing encoded data to said first output and decoding 2,7 RLL encoded data received at said second input and providing decoded data to said second output, said first output and second input coupled to said recovering means;

a disk controller for converting said serial digital data into a parallel data stream that may be transmitted to the host computer, said disk controller being connected to said first input and said second output from said 2,7 RLL encoder/decoder;

a Small Computer System Interface (SCSI) circuit means for coupling said parallel data stream to an external SCSI bus, said bus also coupled to said host computer;

a microprocessor coupled to control said disk controller and SCSI interface circuit means; and said recovering means, disk controller, encoder/decoder, SCSI interface circuit means, and microprocessor all being mounted on one side of one planar printed circuit board and said printed circuit board being positioned along and in close proximity to a generally planar surface defined along the exterior of said housing of the disk drive unit within the overall dimensions of said drive unit so as to provide a combination housing and printed circuit board within said overall dimensions, with said SCSI interface circuit means providing SCSI controller logic and drive logic functions for operating said micro-disk drive in accordance with commands received from the host computer.

2. The disk drive unit of claim 1, and further including means for amplifying the data to be written onto said micro-hard disk, said amplifying means being coupled between said recovering means and said transducer.

3. The disk drive unit of claim 2, wherein said amplifying means is also coupled to amplify data read from said micro-hard disk by said transducer.

4. The disk drive unit according to claim 1, wherein said recovering means comprises a pulse detector coupled to the output of said amplifying means and a data separator coupled between said pulse detector and said encoder/decoder.

5. The disk drive unit according to claim 1, wherein said disk controller and SCSI interface circuit are coupled by a data bus and further including a random access memory (RAM) coupled to said data bus and a dual port buffer controller coupled to control said RAM and coupled to said microprocessor, said buffer controller additionally coupled to said disk controller and to said SCSI interface for controlling the buffering of data being transferred between said SCSI interface and said disk controller via said random access memory.

6. The disk drive unit according to claim 1, wherein said means for moving said transducer is coupled to and is controlled by said microprocessor.

7. The disk drive unit of claim 1, further comprising a preamplifier circuit having a first input coupled to said recovering means, a second input coupled to said transducer, a first output at which amplified data read from said disk by said transducer is present and a second output coupled to said transducer at which amplified data from said first input is present.

8. The disk drive unit of claim 7, wherein said recovering means comprises:

a pulse detector having an input coupled to said first output of said preamplifier and having an output providing 2,7 RLL coded data; and a data separator having an input coupled to said pulse detector output, separating said 2,7 RLL coded data into clock pulses and data pulses and having first and second outputs, respectively, providing clock and data outputs to said encoder/decoder.

9. A disk drive unit according to claim 7, wherein all of the electronics associated with said unit are contained on a single printed circuit board.

10. The high capacity disk drive unit of claim 7, and further including a write precompensation circuit coupled between said encoder/decoder and said preamplifier circuit.

11. A hard-disk drive unit having predetermined overall dimensions for use with a host computer, said drive unit comprising:

at least two micro-hard disks each having a diameter approximately equal to 96 mm and including a plurality of concentric tracks having a density of at least 600 tracks per inch, each disk also having a formatted storage capacity of at least 10 mb and an unformatted storage capacity of at least 12.5 mb;

a housing of predetermined size positioned within the confines of said overall dimensions, said overall dimensions corresponding substantially to the dimensions of a 3½" micro-Winchester hard-disk drive, said housing defining an interior space and having a width substantially the same as the diameter of said at least two micro-hard disks;

a motor mounted within and surrounded by said housing, said motor having a rotatable hub-positioned within said housing, said at least two disks supported on said hub for rotation with said rotatable shaft;

a transducer positioned within and surrounded by said housing for writing serial digital data onto and reading serial digital data from said micro-hard disk;

means positioned within and surrounded by said housing for moving said transducer across the tracks on said micro-hard disk;

recovering means for recovering from said transducer said serial digital data written on said micro-hard disk;

a 2,7 RLL encoder/decoder having a first input for receiving NRZ encoded data, a first output for providing thereat 2,7 RLL coded data, a second input for receiving 2,7 RLL coded data, and a second output for providing decoded NRZ data, said 2,7 RLL encoder/decoder encoding the NRZ data received at said first input and providing encoded data to said first output and decoding 2,7 RLL encoded data received at said second input and providing decoded data to said second output, said first output and second input coupled to said recovering means;

a disk controller for converting said serial digital data into a parallel data stream that may be transmitted to the host computer, said disk controller being connected to said first input and said second output from said 2,7 RLL encoder/decoder;

a Small Computer System Interface (SCSI) circuit means for coupling said parallel data stream to an external SCSI bus, said bus also coupled to said host computer;

a microprocessor coupled to control said disk controller and SCSI interface circuit means; and said recovering means, disk controller, encoder/decoder, SCSI interface circuit means, and microprocessor all being mounted on one single planar printed circuit board and being positioned with said printed circuit board in said housing of the disk drive unit within the overall dimensions of said housing so as to be surrounded by said housing, with said SCSI interface circuit means providing SCSI controller logic and drive logic functions for operating said micro-disk drive in accordance with commands received from the host computer;

wherein said micro-hard disk and said single printed circuit board substantially fill the entire interior space defined by said housing.

* * * * *